US008587789B2

(12) United States Patent
Sesko

(10) Patent No.: US 8,587,789 B2
(45) Date of Patent: Nov. 19, 2013

(54) CHROMATIC POINT SENSOR COMPENSATION INCLUDING WORKPIECE MATERIAL EFFECTS

(75) Inventor: David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 166 days.

(21) Appl. No.: 13/333,944

(22) Filed: Dec. 21, 2011

(65) Prior Publication Data

US 2013/0163006 A1     Jun. 27, 2013

(51) Int. Cl.
*G01B 11/24* (2006.01)

(52) U.S. Cl.
USPC .......................................... 356/609

(58) Field of Classification Search
None
See application file for complete search history.

(56) References Cited

U.S. PATENT DOCUMENTS

| | | | |
|---|---|---|---|
| 5,790,242 | A | 8/1998 | Stern |
| 5,887,009 | A | 3/1999 | Mandella |
| 6,082,067 | A | 7/2000 | Bott |
| 7,369,225 | B2 | 5/2008 | Messerschmidt |
| 7,873,488 | B2 * | 1/2011 | Nahum et al. ............... 702/97 |
| 7,876,456 | B2 * | 1/2011 | Sesko ........................ 356/609 |
| 7,990,522 | B2 * | 8/2011 | Sesko ........................ 356/4.04 |
| 2009/0018700 | A1 | 1/2009 | Okamoto |
| 2013/0162972 | A1 * | 6/2013 | Sesko et al. ............... 356/4.05 |

OTHER PUBLICATIONS

Booth, M.J., et al., "Spectral Confocal Reflection Microscopy Using a White Light Source," Journal of the European Optical Society 3(08026):1-6, 2008.
Cacace, L.A., "An Optical Distance Sensor: Tilt Robust Differential Confocal Measurement With mm Range and nm Uncertainty," doctoral dissertation, Technische Universiteit Eindhoven, Eindhoven, Netherlands, 2009, 275 pages.

* cited by examiner

*Primary Examiner* — Gordon Stock, Jr.
(74) *Attorney, Agent, or Firm* — Christensen O'Connor Johnson Kindness PLLC

(57) ABSTRACT

A method of error compensation in a chromatic point sensor (CPS) reduces errors associated with varying workpiece spectral reflectivity. The errors are associated with a distance-independent profile component of the CPS measurement signals. Workpiece spectral reflectivity may be characterized using known spectral reflectivity for a workpiece material, or by measuring the workpiece spectral reflectivity using the CPS system. CPS spectral reflectivity measurement may comprise scanning the CPS optical pen to a plurality of distances relative to a workpiece surface and determining a distance-independent composite spectral profile from a plurality of resulting wavelength peaks. By comparing the distance-independent composite spectral profile obtained from a workpiece with that corresponding to the CPS distance calibration procedure, the contribution of the reflectivity characteristics of the workpiece will be indicated in the differences between the profiles, and potential CPS position errors due to varying workpiece reflectivity characteristics may be calculated and/or compensated.

19 Claims, 12 Drawing Sheets

CHROMATIC POINT SENSOR COMPENSATION INCLUDING WORKPIECE MATERIAL EFFECTS

FIELD OF THE INVENTION

The invention relates generally to precision measurement instruments, and more particularly to chromatic point sensors and similar optical distance determining devices and their use.

BACKGROUND OF THE INVENTION

It is known to use chromatic confocal techniques in optical height or distance sensors. As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture and so will not couple much power into the fiber. Therefore, for the light returned through the fiber, the signal level will be greatest for the wavelength corresponding to the surface height or distance to the surface. A spectrometer type detector measures the signal level for each wavelength in order to determine the surface height.

The '456 patent further describes that certain manufacturers refer to practical and compact systems that operate as described above, and that are suitable for chromatic confocal ranging in an industrial setting, as chromatic point sensors (CPS). A compact, chromatically-dispersive optical assembly that is used with such systems is referred to as an "optical pen," or a "pen." The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" as indicated by a peak or centroid of the intensity profile, and the resulting pixel coordinate of the peak or centroid is used with a lookup table to determine the distance to the surface. This pixel coordinate may be determined with sub-pixel resolution and may be referred to as the "distance-indicating coordinate."

The '456 patent further describes that, in normal operation, the CPS spectrometer ordinarily receives a certain range or peak region of wavelengths for a certain measurement distance. It is disclosed that the CPS spectrometer may distort the shape of peak region of wavelengths, and thus influence the corresponding peak or centroid and the resulting distance-indicating coordinate. The systems and methods of the '456 patent provide component calibration data, also referred to as compensation data, that encompasses the effects of wavelength-dependent variations (e.g., non-uniform response) in the CPS spectrometer and/or the CPS broadband light source. The compensation data of the '456 patent is used to reduce or eliminate errors associated with these effects in the spectrometer and light source. The compensation data of the '456 patent may be redetermined and/or replaced at various points in time, such that the compensation data remains effective to reduce or eliminate errors despite changes in the spectrometer and/or light source characteristics (e.g., due to component aging, environmental variations, or the like).

Chromatic point sensors provide very high resolution and accuracy (e.g., sub-micron resolution and accuracy) based on distance calibration data that correlates known measurement distances with the resulting dominant wavelength position coordinate (the distance-indicating coordinate) along the array. At the level of resolution and accuracy provided by chromatic point sensors, measurement errors may occur as a result of measurement conditions failing to precisely match the conditions present at the time of calibration, even when the methods of the '456 patent are used.

For example, one source of error in a chromatic point sensor is workpiece-specific spectral reflectivity variations. A chromatic point sensor which allegedly provides a means for compensating for spectral reflectivity variations is disclosed in U.S. Pat. No. 5,790,242 (the '242 patent). Briefly, a confocal beam is split, and the split portions of the beam are spatially filtered at their focus with a confocal aperture and a central stop (which is "an inverse pinhole") to provide respective signals on respective energy collecting detectors. The '242 patent describes that "at an instant of time within the sweep" when the ratio between the aperture signal and the signal from the energy that passes around the central stop is at a maximum, the energy through the aperture is the result of "focus," independent of the reflectivity of the target. A calibration is provided (by unspecified means) which relates the wavelength at this instant in time to the depth of the surface. However, the accuracy of the '242 patent therefore depends on providing a "sweep," and on sensing a relationship between two signals "at an instant," and detecting a dominant wavelength in one of the signals at that instant. Such a system introduces electronic complexity and associated noise sources, and may be difficult for a user to comprehend and/or calibrate. Furthermore, such a system does not gather any data characterizing the target surface reflectivity characteristics, which may be desired as an accuracy or calibration verification, or a material verification, in various applications.

Providing improved and/or more reliable operation for chromatic point sensors by overcoming additional sources of measurement errors that result from changing measurement conditions, and particularly from workpiece-specific spectral reflectivity variations, is desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

As disclosed herein, a chromatic point sensor (CPS) system is configured to compensate for potential errors in its output spectral profile, including errors due to workpiece material effects (e.g., material reflectivity effects), by determining and/or using distance-independent profile component compensation data as outlined below. The distance-independent profile component compensation data may also be usable to compensate for errors associated with light source variations and the like in some embodiments. In accordance with one aspect of the invention, the compensation reduces distance measurement errors that may otherwise result from the spectral reflectivity of the workpiece surface that is being measured varying relative to a spectral reflectivity of a material that underlies the distance calibration of the CPS (e.g., a mirror material used when determining the distance calibration data). As used herein, the term spectral reflectivity approximately means the wavelength dependent ratio of reflected flux or intensity to incident flux or intensity. The spectral reflectivity of workpiece surfaces may vary depending on their material composition, angle of incidence, surface finish, and the like. The invention provides compensated distance measurements wherein errors that would otherwise occur due to the particular spectral reflectivity characteristics of a workpiece surface are reduced or eliminated. As used herein, the term description distance-independent refers to system effects that are unrelated to measurement distance, and may thus be characterized by data that is applied at any or all measurement distances in various embodiments.

The configuration of this invention is easier to use and provides more accurate and robust error compensation in comparison to the '242 patent. It should be noted that the '242 patent does not disclose an embodiment that truly compensates for material spectral reflectivity variations at the level contemplated herein, because in the absence of special calibration or compensation, its embodiment remains susceptible to wavelength intensity weighting effects due to workpiece material reflectivity, and the '242 patent does not teach special calibration or compensation for adjusting a detected wavelength based on the reflecting material. The disclosure of the '456 patent does not mention errors due to material spectral reflectivity variations, nor does it teach a system configuration or method for the purpose of compensating for such errors.

A method is disclosed for operating a chromatic point sensor system to compensate for potential errors including errors due to workpiece material effects. The method may comprise: providing a CPS system comprising an optical pen comprising a confocal optical path including a chromatically dispersive element and configured to focus different wavelengths at different distances proximate to a workpiece surface to be measured, a light source connected to provide an input spectral profile of wavelengths to the optical pen, a CPS electronics comprising a CPS wavelength detector comprising a plurality of pixels distributed along a measurement axis of the CPS wavelength detector, the plurality of pixels receiving respective wavelengths and providing output spectral profile data, wherein the CPS is configured such that when the optical pen is connected to the CPS electronics and operably positioned relative to the workpiece surface to perform measurement operations the optical pen inputs the input spectral profile and outputs corresponding radiation to the workpiece surface and receives reflected radiation from the workpiece surface and outputs reflected radiation to provide an output spectral profile to the CPS wavelength detector, the output spectral profile comprising a distance-dependent profile component having a wavelength peak (in a measurement profile peak region) that indicates a measurement distance from the optical pen to the workpiece surface and a distance-independent profile component that includes a workpiece material component corresponding to spectral profile effects associated with wavelength-dependent reflectivity variations of the material of the workpiece surface, and the CPS electronics provides corresponding output spectral profile data; and distance calibration data used to convert a distance-indicating coordinate corresponding to the wavelength peak to a corresponding distance measurement. The method may also comprise identifying a workpiece surface to be measured, and further comprise operating at least the CPS electronics to define distance-independent profile component compensation data comprising data that are usable to compensate the output spectral profile data for potential measurement distance errors comprising errors associated with the workpiece material component corresponding to the identified workpiece surface.

In some embodiments, the method may further comprise operating the CPS system to perform measurement operations on the identified workpiece surface and provide the corresponding output spectral profile data, applying the distance-independent profile component compensation data to compensate the output spectral profile data arising from the identified workpiece surface, and determining the distance-indicating coordinate corresponding to the wavelength peak based on the compensated output spectral profile data. In some embodiments, applying the distance-independent profile component compensation data to compensate the output spectral profile data comprises adjusting the output spectral profile data to compensate for differences between a distance-independent profile component associated with measurement of the identified workpiece surface and a distance-independent calibration profile component associated with the distance calibration data. In some embodiments, the distance-independent calibration profile component includes an adjustment such that it corresponds to a predetermined calibration spectral profile. In some embodiments, the predetermined calibration spectral profile is a flat profile. In some embodiments, the distance-independent calibration profile component adjustment compensates for wavelength-dependent variations of a light source and a wavelength detector and wavelength-dependent reflectivity variations of a calibration workpiece used for distance measurements used to determine the distance calibration data, such that it conforms to the predetermined spectral profile.

In some embodiments, the step of operating at least the CPS electronics to define the distance-independent profile component compensation data comprises defining data that are usable to compensate the output spectral profile data for potential measurement distance errors comprising errors associated with wavelength-dependent variations of at least one of the light source and the wavelength detector. In some embodiments, the data that are usable to compensate errors associated with the workpiece material component comprise a first set of data, and the data that are usable to compensate errors associated with wavelength-dependent variations of at least one of the light source and the wavelength detector comprise a second set of data that is different than the first set of data. In some embodiments, the distance-independent profile component compensation data comprises a set of data that are usable to compensate both errors associated with the workpiece material component and errors associated with the wavelength-dependent variations of at least one of the light source and the wavelength detector.

In some embodiments, operating at least the CPS electronics to define the distance-independent profile component compensation data comprises inputting predetermined data characterizing the wavelength-dependent reflectivity variations of the material of the identified workpiece surface, and determining the distance-independent profile component compensation data based on that input predetermined data. In some embodiments, the predetermined data may comprise standard (e.g., generally known and/or published) spectral reflectivity data characterizing to the type of material used in the identified workpiece surface.

In some embodiments, operating at least the CPS electronics to define the distance-independent profile component compensation data comprises: operably positioning a material relative to the CPS optical pen, wherein the positioned material is one of (a) the material of the identified workpiece surface and (b) a material corresponding to the material of the identified workpiece surface, performing a wavelength peak scanning operation comprising using the CPS system to perform a plurality of measurement operations corresponding to a plurality of respective distances distributed along a measuring range of the CPS optical pen relative to the positioned material, the plurality of measurement operations providing a corresponding plurality of output spectral profile data including a plurality of wavelength peaks distributed along the measurement axis of the CPS wavelength detector, and determining the distance-independent profile component compensation data based on the plurality of output spectral profile data provided by the wavelength peak scanning operation. In some embodiments, determining the distance-independent profile component compensation data based on the plurality of output spectral profile data provided by the wavelength peak scanning operation comprises: determining a distance-independent profile component associated with measurement of the positioned material based on the plurality of wavelength peaks distributed along the measurement axis of the CPS wavelength detector, determining differences between the distance-independent profile component associated with measurement of the positioned material and a distance-independent calibration profile component associated with the distance calibration data, and determining the distance-independent profile component compensation data such that it compensates for the determined differences. In some embodiments, the distance-independent profile component compensation data is determined in a form comprising one of (a) differences between a normalized magnitude of the profile components at a plurality of pixel locations distributed along the measurement axis of the CPS wavelength detector, and (b) a ratio of the profile components at a plurality of pixel locations distributed along the measurement axis of the CPS wavelength detector.

In various embodiments, regardless of when it is defined or determined, distance-independent profile component compensation data is stored in a memory portion of the CPS system, or a host system communicating with the CPS system, or the like. The CPS system may then be operated to perform measurement operations on the identified workpiece surface and provide corresponding output spectral profile data, recall and apply the distance-independent profile component compensation data to compensate the output spectral profile data arising from the identified workpiece surface, and determine the distance-indicating coordinate corresponding to the wavelength peak based on the compensated output spectral profile data.

Regarding the wavelength peak scanning operation, in some embodiments or applications, at least the optical pen of the CPS system is mounted in a host system, which is one of a machine vision inspection system and coordinate measuring machine, such that it may be positioned relative to an identified workpiece surface to be inspected using the host system. The wavelength peak scanning operation may then comprises operating the host system to move to the plurality of respective distances distributed along a measuring range of the CPS optical pen relative to a positioned material, which may be the material of identified workpiece surface. In some such embodiments, operations comprising performing the wavelength peak scanning operation and storing the determined distance-independent profile component compensation data may be performed during a learn mode of operation of the host system, and operations comprising operating the CPS system to perform measurement operations on the identified workpiece surface and provide the corresponding output spectral profile data, and recalling and applying the determined distance-independent profile component compensation data to compensate the output spectral profile data arising from the identified workpiece surface, and determining the distance-indicating coordinate corresponding to the wavelength peak based on the compensated output spectral profile data may be performed during a run mode of operation of the host system.

Further regarding the wavelength peak scanning operation, in some embodiments, performing the wavelength peak scanning operation comprises moving one of the optical pen and the positioned material continuously to provide at least some of the plurality of respective distances distributed along a measuring range of the CPS optical pen relative to the positioned material, and operating the CPS system continuously during the moving in order to perform at least some of the plurality of measurement operations corresponding to a plurality of respective distances. In some applications, the moving may be provided by manual operation of a stage or the like.

In some embodiments, operating at least the CPS electronics to define workpiece-specific measurement spectral profile compensation data comprises: providing an optical path comprising a portion of the normal operation optical path of the CPS system and excluding the CPS optical pen, wherein the optical path is not configured to focus different wavelengths at different distances, positioning a material to receive light from the CPS light source through the optical path comprising a portion of the normal operation optical path and reflect light from the positioned material through the optical path to the CPS wavelength detector, wherein the positioned material is one of (a) the material of the identified workpiece surface and (b) a material corresponding to the material of the identified workpiece surface, performing a distance-independent measurement operation that provides distance-independent output spectral profile data based on the light reflected from the positioned material through the optical path to the CPS wavelength detector, and determining the distance-independent profile component compensation data based on that distance-independent output spectral profile data. In some such embodiments, determining the distance-independent profile component compensation data based on that distance-independent output spectral profile data may comprise: determining a distance-independent profile component associated with the distance-independent measurement of the positioned material based on that distance-independent output spectral profile data; determining differences between the distance-independent profile component associated with measurement of the positioned material and a distance-independent calibration profile component associated with the distance calibration data; and determining the distance-independent profile component compensation data such that it compensates for the determined differences.

It will be appreciated that CPS measurement profile peak region signals may extend over a range of several pixels on the wavelength detector, or several tens or pixels, or more. In the absence of the compensation methods outlined above, the shape of the CPS measurement profile peak region signals generally includes some type of distortion due to distance-independent variations in the measurement conditions (e.g., reflectivity variations due to specific types of workpiece materials, light source spectrum variations, wavelength detector sensitivity variations, etc.). Unless this peak shape distortion is compensated, the determination of the peak location for the measurement profile peak region will be inconsistent or erroneous for different workpiece surface materials, etc. Thus, in various implementations the error compensation data outlined above is applied to the measurement profile peak region signals prior to the determination of the sub-pixel resolution distance-indicating coordinate that indicates the peak location of the measurement profile peak region signals.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
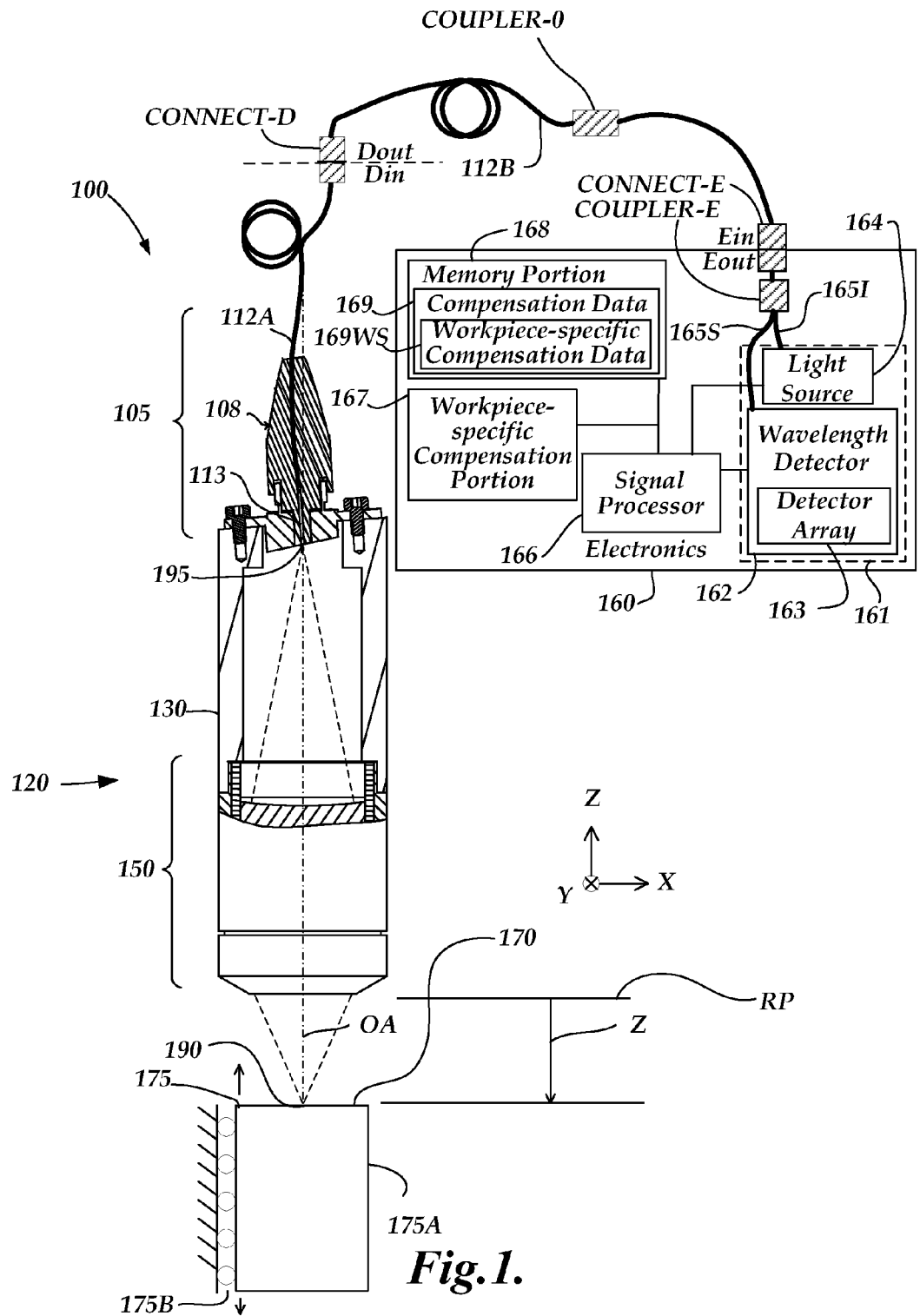
FIG. 1 is a block diagram of one embodiment of an exemplary chromatic point sensor (CPS) system.

FIG. 1 is a block diagram of one exemplary embodiment of a chromatic point sensor (CPS) system 100. As shown in FIG. 1, the CPS system 100 includes an optical pen 120 and an electronics portion 160. In the embodiment shown in FIG. 1, the electronics portion 160 includes a signal processor 166, a memory portion 168 and a source+detector subsystem 161 comprising a wavelength detector 162, and a broadband light source 164 (also referred to as a white light source, in some embodiments). In various embodiments, the wavelength detector 162 includes a detector array 163 of a spectrometer. The detector array 163 may comprises a plurality of pixels distributed along a measurement axis of the wavelength detector 162, the plurality of pixels receiving respective wavelengths and providing output spectral profile data. The wavelength detector 162 may also include related signal processing (e.g., provided by the signal processor 166, in some embodiments) that removes or compensates certain error components from the profile data that is provided by the detector array 163, by using compensation data 169 that may be stored in memory portion 168, as described further below. Thus, certain aspects of the wavelength detector 162 and the signal processor 166 may be merged and/or indistinguishable in some embodiments. The electronics portion 160 is coupled to the optical pen 120 through an optical path including the fiber optic cable 112. In the embodiment shown in FIG. 1, optional or alternative aspects of the optical path are shown, including the fiber optic cable 112 having first and second segments 112A and 112B joined at a connector CONNECT-D in the fiber optic segment 112B, and a coupler COUPLER-O which joins the segment 112B to the electronics portion 160. The light source 164 is connected to input a spectral profile of wavelengths to the fiber optic cable 112. The optical pen 120 includes an in/out fiber optic sub-assembly 105, a housing 130, and an optics portion 150. The in/out fiber optic sub-assembly 105 comprises an in/out optical fiber 113 carried through a fiber optic cable 112 which encases it, and a fiber optic connector 108. The in/out optical fiber 113 outputs an output beam through an aperture 195 and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for chromatic confocal sensor systems. As will be described in more detail below, during measurement operations, the light is focused on a surface location 190 of a workpiece 170. Upon reflection from the surface location 190, the light is refocused by the optics portion 150 onto the aperture 195. Due to the axial chromatic dispersion provided by the optics portion 150, only one wavelength will have the focus distance that matches the measurement distance "Z," which is the distance from a reference position RP that is fixed relative to the optical pen 120 to the surface location 190. The chromatic point sensor is configured such that the wavelength that is best focused at the surface location 190 will also be the wavelength that is best focused at the aperture 195. The aperture 195 spatially filters the reflected light such that predominantly the best focused wavelength passes through the aperture 195 and into the core of the optical fiber 113 of the optical fiber cable 112. As will be described in more detail below, the optical fiber cable 112 routes the signal light to a wavelength detector 162 that is utilized for determining the wavelength having the dominant intensity, which corresponds to the measurement distance Z to the surface location 190.

During normal measurement operations, the broadband light source 164, which is controlled by the signal processor 166, is coupled to the CPS optical pen 120 through a fiber optic path including the illumination fiber segment 165I, the 2×1 coupler COUPLER-E, CONNECTOR-E, and the fiber optic cable 112. As described above, the light travels through the optical pen 120 which produces longitudinal chromatic aberration. The wavelength of light that is most efficiently transmitted back through the aperture 195 and into the fiber optic cable 112 is the wavelength that is in focus on the surface location 190. The reflected wavelength-dependent light intensity then passes back through the fiber optic path to the electronics portion 160 and the coupler COUPLER-E so that approximately 50% of the light is directed through the signal fiber segment 165S to the wavelength detector 162. The wavelength detector 162 receives the wavelength-dependent light intensity, converts it to an output spectral intensity profile (also referred to simply as an output spectral profile) distributed over an array of pixels along a measuring axis of the detector array 163, and operates to provide corresponding output spectral profile data based on pixel data output from the detector array 163. The output spectral profile comprises a distance-dependent profile component which includes a wavelength peak due to the operation of the optical pen 120, and distance-independent profile component that includes a workpiece material component, as described in greater detail below. The output spectral profile data includes the distance-dependent profile component and the distance-independent profile component.

As shown in FIG. 1, the CPS electronics 160 comprises a workpiece specific compensation portion 167. The compensation portion 167 may process output spectral profile data and compensate the output spectral profile data for potential errors comprising errors associated with the workpiece material component (and other distance-independent profile component errors, in some embodiments), e.g., using stored compensation data 169 and/or workpiece specific compensation data 169WS, according to methods outlined further below. In some embodiments, the workpiece specific compensation portion 167 may also determine the stored workpiece-specific spectral profile compensation data 169WS based on output spectral data acquired and analyzed by methods outlined further below. It should be appreciated that certain aspects of the compensation portion 167 and the signal processor 166 may be merged and/or indistinguishable in some embodiments.

After compensation is applied for the distance-independent profile component, including the workpiece material component, the subpixel-resolution distance-indicating coordinate (DIC) of the profile data is calculated by the signal processor 166 and the DIC determines the measurement distance Z to the surface location 190 via a distance calibration lookup table or the like, which is stored in the memory portion 168, as will be described in more detail below with respect to FIG. 4. The distance-indicating coordinate may be determined by various methods described further below (e.g., by determining the centroid of profile data included in a peak region of the profile data). When the distance-indicating coordinate is determined during calibration operations, it may be referred to as a calibration distance-indicating coordinate, and when it is determined during workpiece surface measurement operations, it may be referred to as a measurement distance-indicating coordinate. The profile data used to determine the subpixel distance-indicating coordinate is described in greater detail below.

FIG. 1 includes orthogonal XYZ coordinate axes, as a frame of reference. The Z direction is defined to be parallel to the optical axis, or distance-measuring axis, of the optical pen 120. As illustrated in FIG. 1, during operation, the workpiece 170 is placed along the optical axis OA of the optical pen 120.

In one embodiment, the workpiece 170 is aligned and mounted on a translation stage 175 which may be advantageously aligned such that it translates along the X axis direction constrained by guide bearings 175b, with its surface 175A nominally parallel to the XY plane. Other exemplary features and operations of the chromatic point sensor 100 will be described in more detail below.

Figure 2:
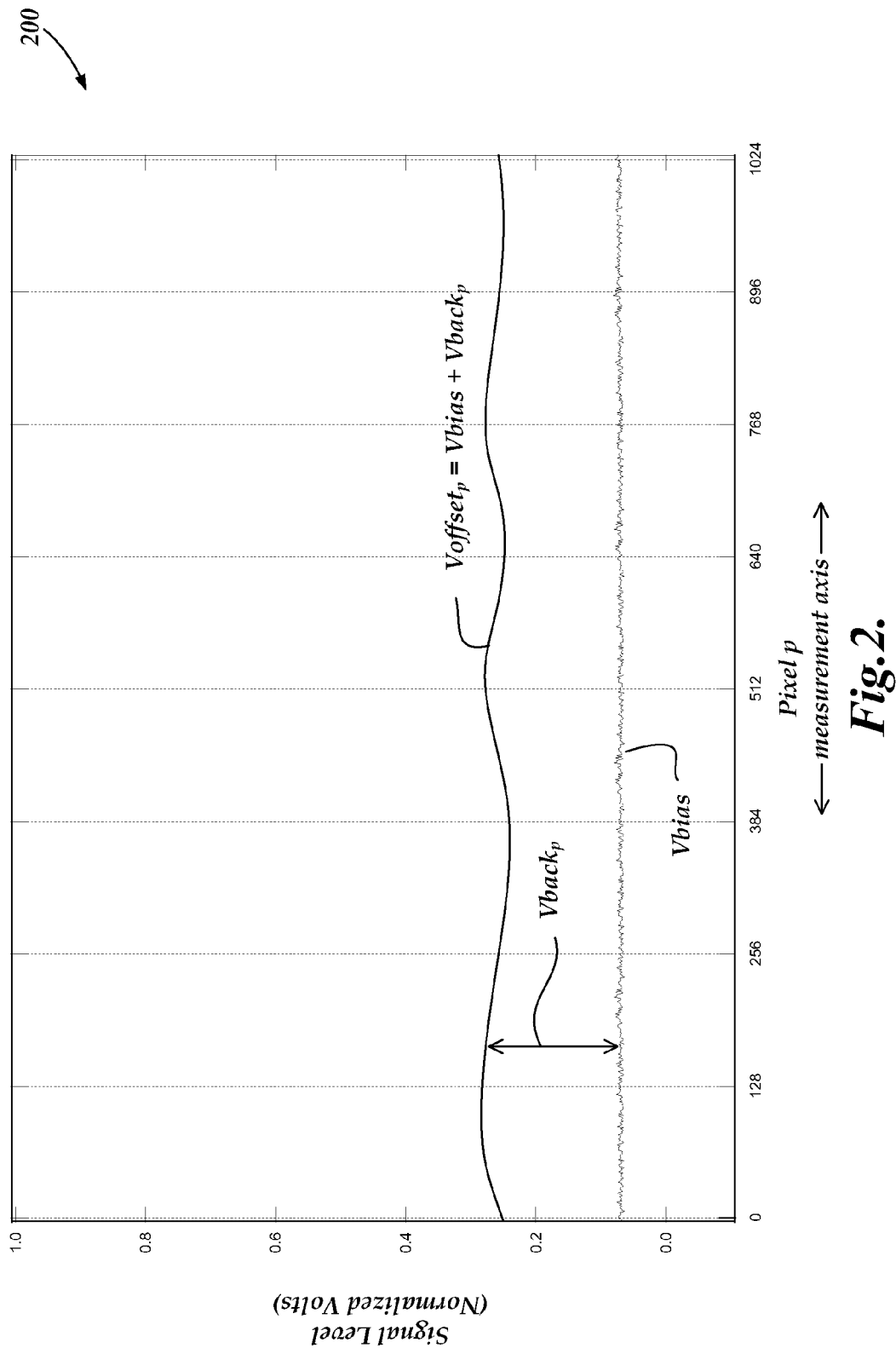
FIG. 2 is a diagram of profile data from a chromatic point sensor illustrating voltage offset signal levels for the pixels in a detector array.

The following description of FIG. 2 outlines certain known background signal processing and/or calibration operations that may be used in combination with this invention, in various embodiments. The purpose of this description is to emphasize that the inventive methods disclosed further below are distinct from, but compatible with, these operations. FIG. 2 is a diagram 200 of profile data from a chromatic point sensor illustrating voltage offset signal levels Voffset(p) for the pixels in a detector array 163 when no measurement surface is present (e.g., the surface location 190 of the workpiece 170 of FIG. 1 is not present), such that there is no intentionally reflected light and no significant dominant wavelength peak in the resulting intensity profile. As shown in FIG. 2, the voltage offset signal Voffset(p) is plotted in normalized volts, for each of 1,024 pixels. "Normalized volts" assigns a value of 1.0 to the saturation voltage of the detector array 163. The voltage offset signal Voffset(p) includes a bias signal level Vbias, which is shown as unvarying across the array, and a background signal component Vback(p), which is shown as being dependent upon the pixel coordinate p across the array. The variable background signal Vback(p) represents signals such as background light from wavelength-dependent spurious reflections and the like in the chromatic point sensor, as well as due to the dark current of the various pixels p. In various embodiments, it is advantageous if the signal components Vback(p) (or signals that show the same variation, such as the voltage offset signals Voffset (p)) are stored for calibration or compensation of the pixel array of the detector array 163, and used to compensate all subsequent profile data signals from each pixel p (e.g., by subtraction), on an ongoing basis. Thus, it will be understood that the background signal component Vback(p) is assumed to be compensated in a known manner in various embodiments according to this invention, and it is not necessary that it be further explicitly considered or described in relation to the various intensity profiles or inventive signal processing operations, or the like, described below.

In contrast to the background signal component Vback(p), which may be relatively stable over time, the coordinate-independent bias signal level Vbias may change as a result of voltage drifts associated with ambient temperature changes and heat generated by the electronics portion 160 during operation.

Figure 3:
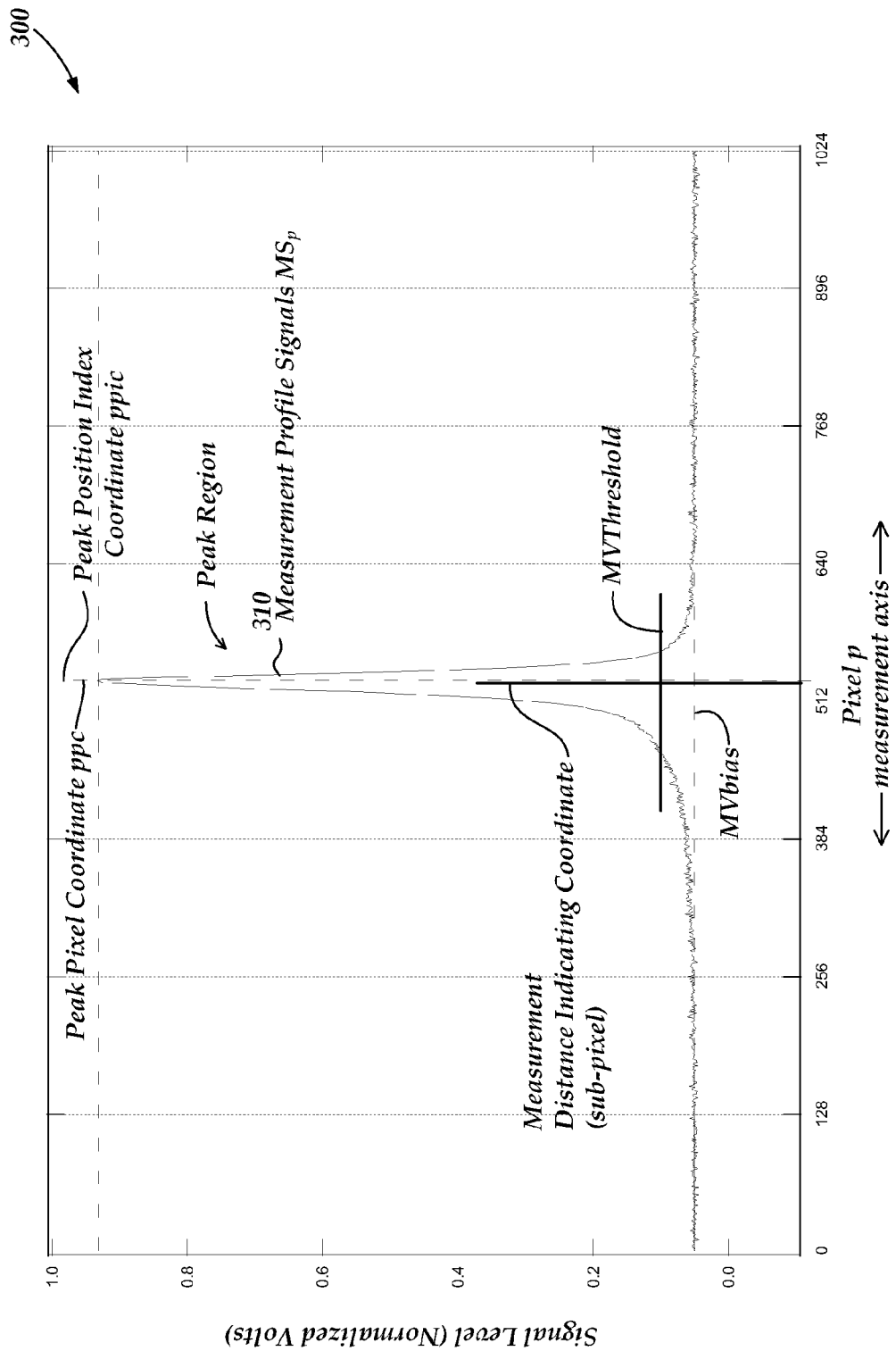
FIG. 3 is a diagram of profile data from a chromatic point sensor illustrating a peak region signal corresponding to a measurement distance-indicating coordinate.
Figure 4:
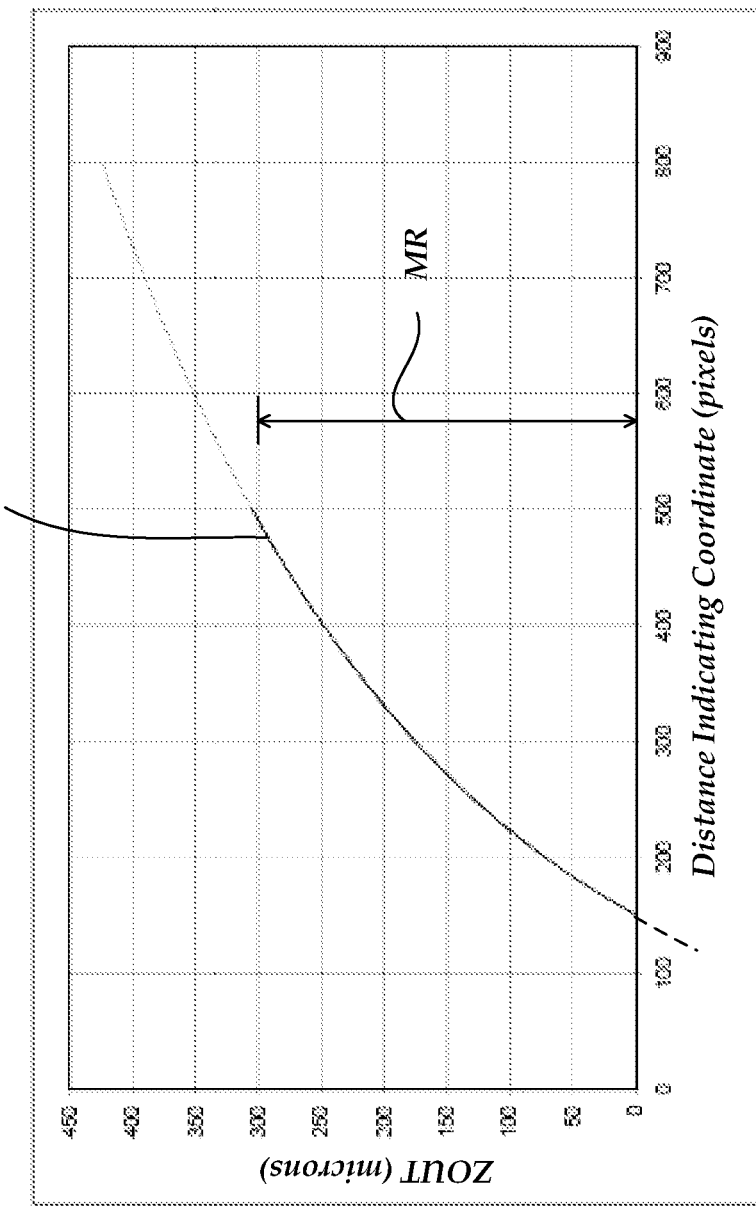
FIG. 4 is a diagram of chromatic point sensor distance calibration data which correlates known measurement distances with distance-indicating coordinates for a chromatic point sensor.

The following description of FIGS. 3 and 4 outlines certain signal processing operations that determine distance-indicating coordinates based on a distance-indicating subset of the profile data that is dynamically adapted to compensate for changes in the contemporaneous bias signal level Vbias, resulting in more repeatable distance measurements. The operations outlined here are described in more detail in the '456 patent. The purpose of this description is to provide background information which is useful for an overall understanding of chromatic point sensor distance measurement operations, and to emphasize that the inventive methods disclosed further below are distinct from, but compatible with, these operations.

FIG. 3 is a diagram 300 of profile data 310 (measurement profile signal data) from a CPS detector (e.g., detector 162), as acquired during CPS measurement operations, either during certain optical pen or overall system calibration operations or during regular measurement operation. The profile data 310 may also be referred to as the profile signals MS(p), where MS(p) is the signal level (shown in normalized volts) associated with each pixel p of a detector array (e.g., the detector array 163). The graph 300 of FIG. 3 is created with a target surface positioned at some distance along the optical axis OA of the optical pen 120, producing the corresponding measurement profile data 310 having the dominant wavelength peak region shown in FIG. 3.

FIG. 3 shows a bias signal level MVbias (in normalized volts), a peak pixel coordinate ppc, a peak position index coordinate ppic, and a data threshold MVthreshold that defines the lower limit of a distance-indicating subset of the data in the peak region. All "MV" values are in normalized volts. FIG. 3 also shows a distance-indicating coordinate (DIC) that is determined based on the distance-indicating subset of the data in the calibration spectral peak region. As described in the '214 Application, MVthreshhold may be an index-specific threshold, MVthreshhold(ppic), in some embodiments.

Briefly, in one embodiment, measurement operations for determining a distance-indicating coordinate (e.g., a distance-indicating coordinate DIC, as described relative to the profile data 310), may include the following:

Position the target surface along the optical axis OA and capture the resulting profile data 310.

Determine the peak pixel coordinate (that is, the pixel having the highest signal).

Determine the peak position index coordinate ppic, which is the index for storing and retrieving certain calibration data (e.g., index-specific threshold calibration data). This may be the same as the peak pixel coordinate in some embodiments.

Determine the measurement bias signal level MVbias.

Determine the data threshold MVthreshhold (e.g., as a percentage of the peak height or based on index-specific threshold calibration data that corresponds to the current peak position index coordinate ppic).

Determine the distance-indicating coordinate (DIC) with sub-pixel resolution, based on the distance-indicating subset of the data that has a value greater than MVthreshhold in the measurement peak region.

For a distance calibration measurement, independently determine the corresponding distance to the target surface with a desired accuracy (e.g., by interferometer), and determine a distance calibration data point in a distance calibration table or curve (e.g., a distance calibration table or curve such as that represented by the distance calibration data 410, shown in FIG. 4).

For a normal workpiece distance measurement, determine the measurement distance by correlating the measurement DIC with a corresponding distance in the stored distance calibration data (e.g., a distance calibration table or curve such as that represented by the distance calibration data 410, shown in FIG. 4).

In the foregoing operations, the distance-indicating coordinate DIC may be determined with sub-pixel resolution, based on the distance-indicating subset of data above MVthreshhold. A measurement DIC may be determined according to one of a number of different methods. In one embodiment, a measurement DIC may be determined as the subpixel-resolution coordinate of a centroid $X_C$ of the distance-indicating subset of data. For example, for a detector with 1024 pixels, the centroid $X_C$ may be determined according to:

$$Xc = \frac{\sum_{p=1}^{1024} p(S_M(p))^n}{\sum_{p=1}^{1024} (S_M(p))^n} \quad \text{(Eq. 1)}$$

where, $$S_M(p) = \begin{cases} MS_p - MVThreshold(ppic), & \text{for } MS_p \geq MVThreshold(ppic) \\ 0, & \text{for } MS_p < MVThreshold(ppic) \end{cases} \quad \text{(Eq. 2)}$$

In one specific example, n=2, in EQUATION 1. It will be appreciated that EQUATION 2 restricts the data used in the centroid calculation to a distance-indicating subset of data. When the distance-indicating coordinate DIC is determined during calibration operations, it may be referred to as a calibration distance-indicating coordinate, as well as a measurement distance-indicating coordinate.

FIG. 4 is a diagram 400 of CPS measurement distance calibration data 410 which correlates known or calibrated measurement distances ZOUT (in microns) along the vertical axis with distance-indicating coordinates (in units of pixels) along the horizontal axis for the chromatic point sensor 100 or the like. The example shown in FIG. 4 is for an optical pen having a specified measurement range MR of 300 microns, which corresponds to calibration distance-indicating coordinates in the range of approximately 150-490 pixels. However, the chromatic point sensor 100 may be calibrated over a larger pixel range of the detector array 163, if desired. The reference or "zero" ZOUT distance is somewhat arbitrary and may be set at a desired reference distance relative to the optical pen 120. Although the distance calibration data 410 appears to form a smooth curve, it should be appreciated that the distance calibration 410 for a typical prior art CPS system, particularly for economical CPS systems, may exhibit short-range errors or irregularities.

In some embodiments, the CPS measurement distance calibration data 410 may be determined and/or used as outlined above with reference to FIG. 3. One exemplary laboratory calibration method is briefly outlined here, to further clarify the nature of the CPS distance calibration data 410. Briefly, a minor may provide a calibration surface (e.g., substituting for the surface 190 of FIG. 1) along the optical axis OA of the CPS optical pen. The displacement of the mirror may be controlled in approximately 0.1 or 0.2 micron steps. For each step, the actual mirror position or displacement is acquired using a reference standard such as an interferometer. For each actual minor position, the corresponding calibration distance-indicating coordinate (DIC) of the chromatic point sensor is determined, based on the corresponding intensity profile data provided by the CPS detector (e.g., as outlined previously). The calibration distance-indicating coordinate and the corresponding actual position are then recorded to provide the calibration data 410.

Later, during measurement operations, to provide a distance measurement for a workpiece surface (e.g., surface 190 of FIG. 1), the workpiece surface is positioned along the optical axis OA of the CPS optical pen. The measurement distance-indicating coordinate of the chromatic point sensor is determined, based on the measurement distance-indicating coordinate determined from the intensity profile data provided by the CPS detector. Then, the distance calibration data 410 is used to determine the CPS measurement distance ZOUT that corresponds to that specific measurement distance-indicating coordinate.

As disclosed in the '456 patent, in the absence of the compensation methods taught in the '456 patent, the shape of the CPS measurement profile peak region signals generally includes some type of distortion that is unique to specific to a light source, or wavelength detector, or both (the source+ detector subsystem), as explained in greater detail below. Unless this unique shape distortion is compensated, the determination of the peak location for the profile peak region will be inconsistent or erroneous for different CPS systems, and/ or potentially for various measurement distances within a particular CPS system. The '456 patent teaches that distortion-removing error compensation factors for the source+ detector subsystem may be applied to measurement profile peak region signals prior to the determination of the sub-pixel resolution distance-indicating coordinate that indicates the peak location of the measurement profile peak region signals. The '456 patent also teaches that in various embodiments, the CPS distance-indicating coordinates used in the CPS distance calibration data may be based on error-compensated measurement profile signal data that is error-compensated for effects of the source+detector subsystem. For example, as taught in the '456 patent, the system used for calibration may provides error-compensated measurement profile signal data based on source+detector error compensation factors determined relative to a standardized or reference set of profile signal data. When using the same optical pen at a later time and/or with a different source+detector subsystem, the source+detector subsystem may provide error-compensated measurement profile signal data based on error compensation factors determined for that source+detector subsystem relative to the same standardized or reference set of profile signal data, such that the CPS distance calibration data is valid for that source+detector subsystem.

Figure 5:
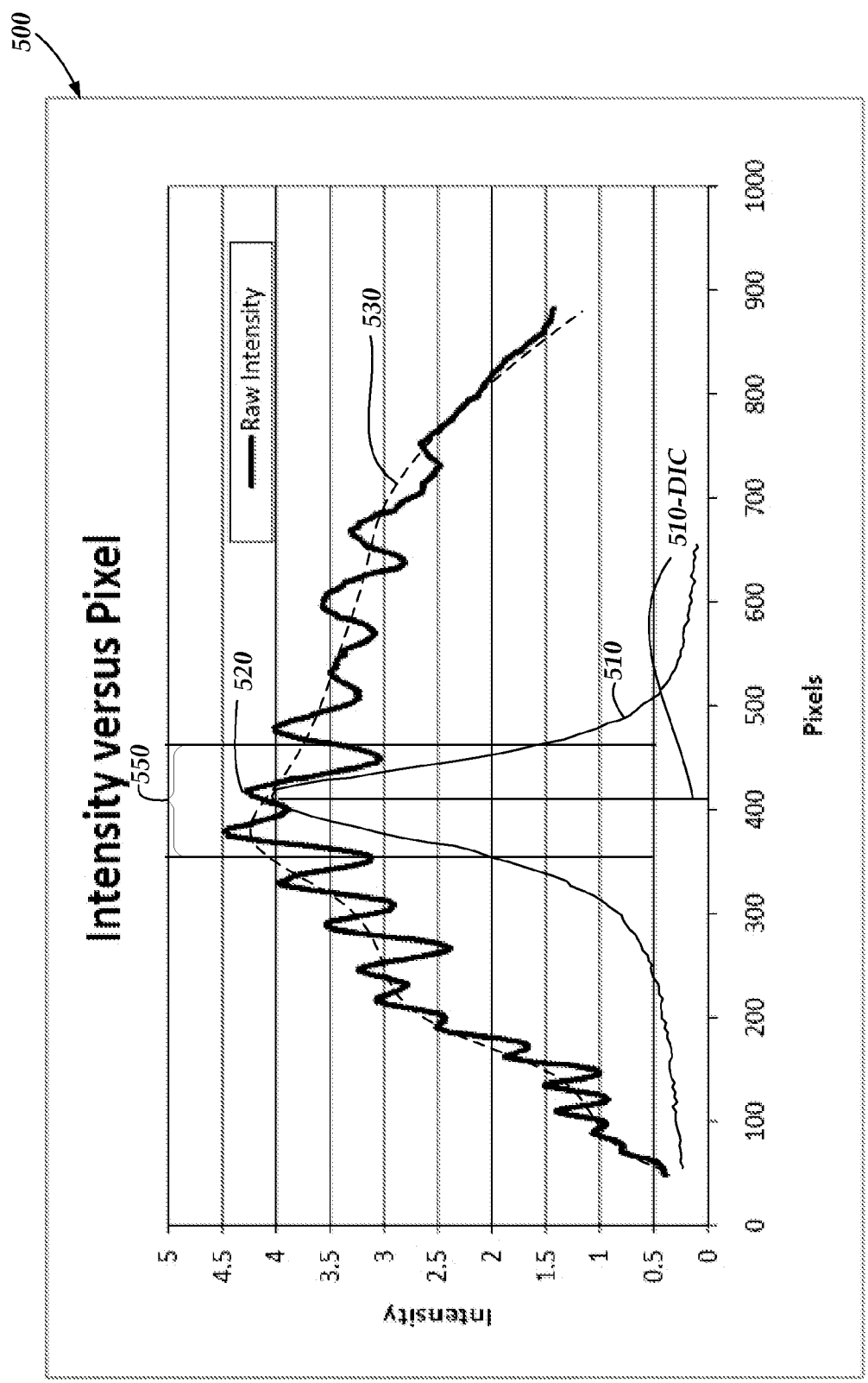
FIG. 5 is a diagram of a graph illustrating a raw intensity profile signals for a CPS source+detector subsystem, as well as a signal component attributed to a CPS light source and representative ideal peak region signal corresponding to a measurement distance-indicating coordinate.
Figure 6A:
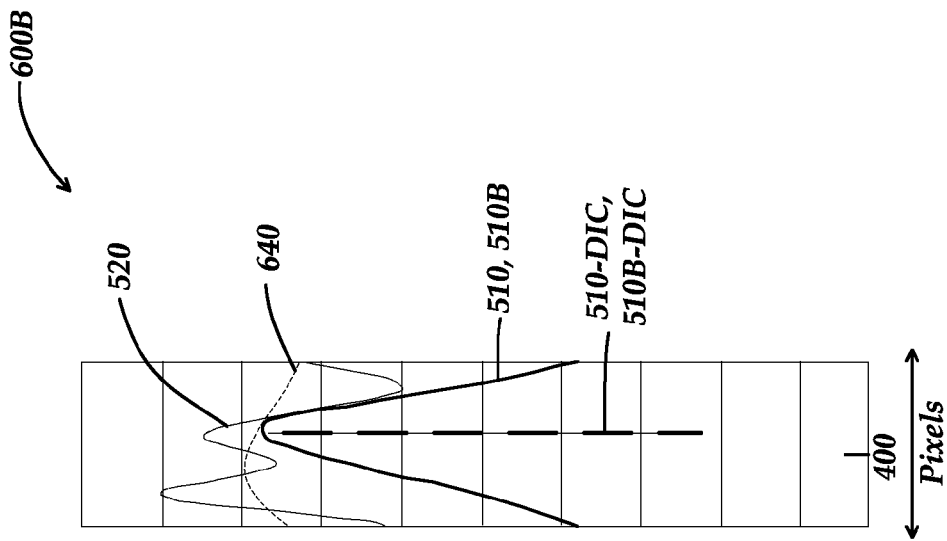
FIGS. 6A and 6B are diagrams of a selected portion of the graph of FIG. 5 illustrating the effects of raw intensity profile signal components on the distance-indicating coordinate determined for a peak region signal corresponding to a measurement distance-indicating coordinate.
Figure 6B:
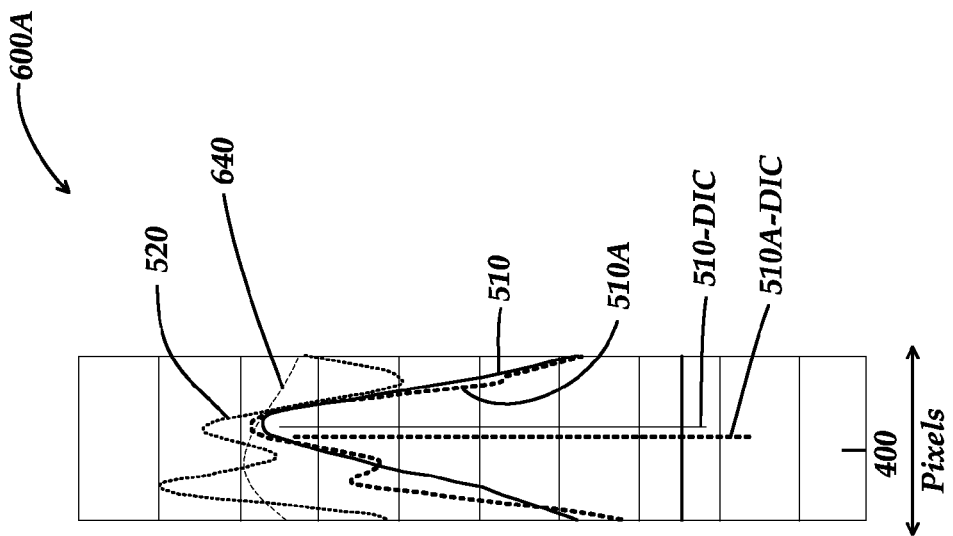

FIG. 5 and FIGS. 6A and 6B help to illustrate a type of source+detector subsystem compensation taught in the '456 patent. The points outlined below are similar to points described in relation to similar figures in the '456 patent, which may supplement the understanding provided below. In the following equations, unless otherwise indicated by explanation or context, "Z" refers to an actual measurement distance to a workpiece surface. "ZOUT" refers to the distance measurement output by the CPS based on a determined distance-indicating coordinate DIC, which in turn depends on the corresponding profile signals $MS_p$, as previously described with respect to FIGS. 3 and 4. It will be appreciated that for each measurement distance Z, the CPS will actually produce a unique set of these signals which depend on Z. Therefore, we refer to each such set of profile signals as MSp(Z), which produces a corresponding distance-indicating coordinate DIC(Z) (e.g., determined according to EQUATIONS 1 and 2), which produces a corresponding CPS measurement output ZOUT(Z). Using these conventions, the previous explanation indicates that the DIC(Z) that is associated with a distance Z depends on the overall shape or profile of the peak region of the corresponding measurement profile data MSp(Z). We also introduce here $MS_p$ superscripts that will be used further below, and the superscripts RAW (meaning not compensated for the current measurement conditions), COMP (meaning compensated), REF (meaning a reference or calibration condition), and PEN (meaning as produced by the optical pen 120 based on a designated or standardized source intensity spectrum).

Using these conventions, we introduce the following expression:

$$MS_P^{RAW}(Z) = SI_P^{RAW} * KPEN_P(Z) * DG_P^{RAW} \tag{Eq. 3}$$

wherein: $SI_P^{RAW}$ describes the relative or normalized intensities of the wavelengths included in the broadband light of a CPS light source, as the wavelengths are distributed at each pixel P of a designated or standardized wavelength detector. $KPEN_P(Z)$ describes the relative or normalized transmission (or attenuation) of the wavelengths included in a set of measurement profile data input from a CPS pen to a CPS wavelength detector for a measuring distance Z, as the wavelengths are distributed at each pixel P of a designated or standardized wavelength detector. $KPEN_P(Z)$ may be thought of as a distance-dependent transfer function of the CPS pen for each wavelength (or its corresponding detector pixel). $DG_P^{RAW}$ describes the relative or normalized signal gain associated with each pixel of a wavelength detector. Thus, EQUATION 3 indicates approximately that for a given measuring distance Z, the raw wavelength detector signal $MS_P^{RAW}(Z)$ at each pixel P equals the raw intensity $SI_P^{RAW}$ input to CPS pen at the wavelengths that reach pixel P, times the distance-dependent transfer function of the CPS pen $KPEN_P(Z)$ for the wavelengths that reach pixel P for distance Z, times the signal gain $DG_P^{RAW}$ for pixel P.

To briefly explain a type of source+detector subsystem compensation taught in the '456 patent, FIG. 5 is a diagram of a graph 500 illustrating a raw intensity profile signal 520 for a CPS source+detector subsystem, which includes a long-range signal variation component 530 that may be attributed to the CPS light source, and other long range variation components of the CPS system throughput, such as detector wavelength sensitivity. It will be appreciated that the long-range signal variation component 530 is not actually detected individually by the wavelength detector 162, but may approximately correspond to a smoothed and/or standard shape for a source+detector intensity profile in some embodiments, and provides a convenient reference for the purposes of this disclosure. A representative ideal measurement profile signal data 510 corresponding to a measurement distance-indicating coordinate 510-DIC, is also shown. The raw intensity profile signal 520 may be acquired by bypassing an optical pen, as taught in the '456 patent, and is thus, one instance of a distance-independent spectral profile which contains only a distance-independent profile component. The raw intensity profile signal 520 may be acquired, for example, using one of the configurations outlined in the '456 patent in which a fiber optic loop (e.g., corresponding to CONNECTOR-F in FIG. 1) is attached to an input source light from a connector (e.g., corresponding to CONNECTOR-E in FIG. 1) and returned it back through that connector to the source+detector subsystem 161. We may define the raw intensity profile signal 520 to be a set of signals $SDSS_P^{RAW}$ that characterize the source+detector subsystem 161, approximately as follows:

$$SDSS_P^{RAW} = SI_P^{RAW} * DG_P^{RAW} \tag{Eq. 4}$$

For future reference, we may substitute EQUATION 4 into EQUATION 3 and write:

$$MS_P^{RAW}(Z) = SDSS_P^{RAW} * KPEN_P(Z) \tag{Eq. 5}$$

The raw intensity profile signal 520 The source+detector variations reflected in the source+detector terms $SI_P^{RAW}$ and $DG_P^{RAW}$ and $SDSS_P^{RAW}$ in EQUATIONS 4 and 5 may lead to errors in determining distance-indicating coordinates as outlined below with reference to FIGS. 6A-6B.

The ideal measurement profile signal data 510 corresponds to a reference or standardized intensity profile times the term $KPEN_P(Z)$. The term $KPEN_P(Z)$ shown in EQUATIONS 5 and 3 may be thought of as a distance-dependent transfer function of an optical pen (e.g., the optical pen 120) for each wavelength (or its corresponding detector pixel), as previously indicated. It should be emphasized that the ideal measurement profile signal data 510 and the corresponding measurement distance-indicating coordinate 510-DIC are not included in the signal 520. Rather, they are provided in FIG. 6 only to support an explanation of a segment 550 of the graph 500. The explanation based on the segment 550 is continued below with reference to FIGS. 6A and 6B.

FIGS. 6A and 6B are diagrams 600A and 600B including the segment 550 of the graph of FIG. 5, including the raw intensity profile signal 520 for a CPS source+detector subsystem, the representative ideal measurement profile signal data 510 and its corresponding ideal distance-indicating coordinate 510-DIC, as previously described. FIGS. 6A and 6B also include a reference profile signal 640 representing standardized or reference set of profile signal data used for calibration as taught in the '456 patent and outlined above (e.g., corresponding to an actual or compensated intensity profile signal used to establish the distance calibration data 410 shown in FIG. 4). In some embodiments, the reference profile signal 640 may be approximately the same as the signal variation component 530 shown in FIG. 5, or an actual profile (e.g., as represented in EQUATION 4) used for calibration. However, more generally, it may alternatively be an ideal or standardized profile (e.g., a flat profile). As previously indicated, the raw intensity profile signal 520 corresponds to a set of signals $SDSS_P^{RAW}$ that characterizes the source+detector subsystem 161, and the ideal measurement profile signal data 510 corresponds to a reference or standardized intensity profile times the term $KPEN_P(Z)$, which may be thought of as a distance-dependent transfer function of a CPS pen (e.g., the optical pen 120), for the wavelength(s) at each detector pixel P. EQUATION 5 describes a set of raw measurement profile signal data $MS_P^{RAW}(Z)$ that is the product of a raw or non-standardized intensity profile produced by a CPS source+detector subsystem 161 times the distance-dependent transfer function $KPEN_P(Z)$ of an optical pen, for a workpiece surface at the distance Z from the optical pen. This corresponds to the raw measurement profile signal data 510A in FIG. 6A. As shown in FIG. 6A, the wavelength-dependent variations in a particular source+detector subsystem 161 (as reflected in the signal 520) cause corresponding unique irregularities and asymmetry in the shape of the peak region of the raw measurement profile signal data 510A distorting it in a unique manner relative to the peak region of the ideal measurement profile signal data 510 that corresponds to a reference or standardized intensity profile times the distance-dependent transfer function term $KPEN_P(Z)$ of an optical pen. Of course, a distance-indicating coordinate 510A-DIC determined for the uniquely distorted raw measurement profile signal data 510A will be source+detector-subsystem-specific, and will disagree with the distance-indicating coordinate 510-DIC corresponding to the undistorted ideal measurement profile signal data 510. For example, note that a relatively small shift in the location of the measurement profile signal data 510 (e.g., a shift 20 pixels to the left in FIGS. 5, 6A, and 6B), which corresponds to a relatively small change in Z, would drastically change the shape of the raw measurement profile signal data 510A. The relative location of the resulting distance-indicating coordinate would thus change rather erratically compared to the small change in Z. In much of the prior art, the peak region is unjustifiably assumed to be relatively narrow, and the significance of such shape distortions and asymmetries are therefore not adequately accounted for in CPS design or signal processing (e.g., a peak a few pixels wide is assumed to not exhibit significant distortion or asymmetry, and so on).

FIG. 6B illustrates the results of an improved signal processing method, according to teachings included in the '456 patent. In FIG. 6B, the variations of the signals $SDSS_P^{RAW}$ that characterize the source+detector subsystem 161 are removed or compensated relative to a reference profile (e.g., as represented by the reference profile signal 640). Using previously defined naming conventions, the reference profile signal 640 corresponds to a set of signals $SDSS_P^{REF}$, and the compensated measurement profile signal data 510B corresponds to a set of signals $MS_P^{COMP}(Z)$:

$$MS_P^{COMP}(Z) = SDSS_P^{REF} * KPEN_P(Z) \quad \text{(Eq. 6)}$$

As shown in FIG. 6B, the peak region of the compensated measurement profile signal data 510B, which corresponds to the set of signals $MS_P^{COMP}(Z)$, nominally matches the ideal measurement profile signal data 510 because the profile comprising the set of signals $SDSS_P^{REF}$ nominally matches the reference profile signal 640. The distance-indicating coordinate 510B-DIC corresponding to the compensated measurement profile signal data 510B therefore more closely agrees with the distance-indicating coordinate 510-DIC corresponding to the ideal measurement profile signal data 510.

For future reference, we define a set of compensation factors $KCOMP_P$ that may be based on these signals:

$$KCOMP_P = \frac{SDSS_P^{REF}}{SDSS_P^{RAW}} \quad \text{(Eq. 7)}$$

That is, since the profile or set of signals $SDSS_P^{REF}$ are known because they are the reference set (e.g., as used for distance calibration), and the profile or set of raw signals $SDSS_P^{RAW}$ may be known because they may be measured as taught in the '456 patent and/or as disclosed herein, then a set of compensation factors $KCOMP_P$ may be determined that convert the raw measurement signal values $MS_P^{RAW}(Z)$ to compensated measurement signal values $MS_P^{COMP}(Z)$, in order to match distance calibration data (e.g., the distance calibration data 410, for example), as shown below.

Using the relationship of EQUATION 7, we may rewrite EQUATION 6 as:

$$MS_P^{COMP}(Z) = KCOMP_P * (SDSS_P^{RAW} * KPEN_P(Z)) \quad \text{(Eq. 8)}$$

Combining EQUATIONS 8 and 5:

$$MS_P^{COMP}(Z) = KCOMP_P * MS_P^{RAW}(Z) \quad \text{(Eq. 9)}$$

As previously indicated, the present invention is aimed toward employing compensation data to compensate for errors associated with material spectral reflectivity variations (and for errors associated other distance independent profile components, in some embodiments). In some embodiments, the CPS system is also used to provide certain output profile data and analyze that data to determine to workpiece-specific compensation data for compensating for errors associated with material spectral reflectivity variations, etc., as outlined in greater detail below. The '456 patent and/or the foregoing equations do not consider errors due to material spectral reflectivity variations. The source of such errors may be understood with reference to FIG. 7.

Figure 7:
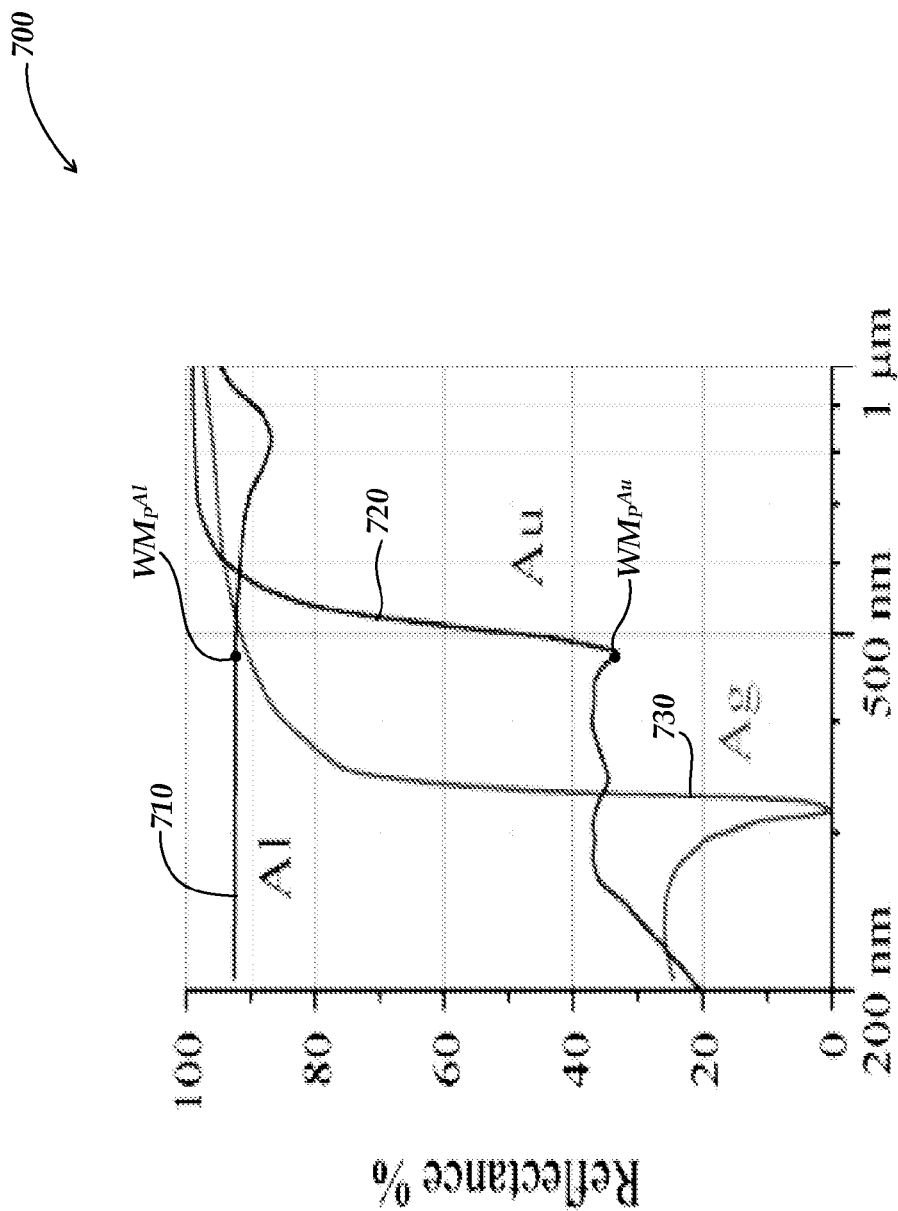
FIG. 7 is a diagram of a graph illustrating the spectral reflectivity of different types of workpiece materials.

FIG. 7 is a diagram of a graph 700 illustrating the spectral reflectivity of different types of workpiece materials, which may vary significantly at some wavelengths, depending on the material composition, angle of incidence, and surface properties. FIG. 7 shows an aluminum mirror spectral reflectivity curve 710, a gold minor spectral reflectivity curve 720, and a silver minor spectral reflectivity curve 730. All of the spectral reflectivity curves are measured at normal angles of incidence. As shown, the reflectivity of the materials is wavelength dependent. As a specific example, the reflectivity of gold changes from 60% to 95% as the wavelength changes from 500 nm to 600 nm, which is generally within the sensing range of a CPS wavelength detector. It will be appreciated that such factors may be particularly relevant in certain applications (e.g., gold is widely used in the electronics and/or semiconductor industry where precision measurements are required). It should also be noted that the aluminum mirror spectral reflectivity curve 710 is relatively flat, which in certain embodiments makes it suitable for calibration operations. Other types of surface materials may have more complex and unpredictable spectral reflectivities (e.g., painted surfaces, thin films, dielectric materials, plastics, etc.). It will be appreciated that material spectral reflectivity variations such as those discussed above will cause different materials to create different distortions in their resulting raw intensity profile signals (e.g., similar to the distortions previously discussed with reference to FIG. 6A), which may cause the wavelength peak location and DIC to be in error, relative to the calibration conditions of the CPS system.

The disclosure of the '456 patent does not mention errors due to material spectral reflectivity variations, nor does it disclose a configuration that can be used to compensate for such errors. In order to describe and account for such errors, we may modify various equations from above. In particular, we may understand EQUATION 4, to represent distance-independent profile or spectrum shape determinants or components (e.g., the profile component due to the light source spectrum represented by the term $SI_P^{RAW}$, and the profile component due to the detector gain represented by the term $DG_P^{RAW}$, in EQUATION 4). That is, in contrast to the distance-dependent profile component term $PEN_P(Z)$ which is determined or contributed by an optical pen, the terms of EQUATION 4 do not depend on the measurement distance to the workpiece. Material spectral reflectivity variations may be regarded as another distance-independent profile components or spectrum shape determinant. Therefore, we may modify EQUATION 4 to account for material spectral reflectivity variations of a workpiece surface (and/or a calibration surface), as follows:

$$SDSS(MAT)_P^{RAW} = SI_P^{RAW} * DG_P^{RAW} * MWF(MAT)_P \quad \text{(Eq. 10)}$$

where the signals $SDSS(MAT)_P^{RAW}$ characterize the distance-independent raw intensity profile associated with a source+detector subsystem 161 used in combination with a particular workpiece surface (or calibration surface) compromising a material MAT (e.g., aluminum, gold, etc.). The material wavelength factors $MWF(MAT)_P$ will be understood to be factors (e.g., normalized factors) that characterize the relative reflectivity of the material (e.g., as shown in FIG. 7) at wavelengths corresponding to the detector pixels P. Based on the explanation above, it will be understood that the corresponding modification of EQUATION 5 to indicate workpiece surface material effects is:

$$MS(MAT)_P^{RAW}(Z) = SDSS(MAT)_P^{RAW} * KPEN_P(Z) \quad \text{(Eq.11)}$$

and the corresponding modification of EQUATION 7 to indicate workpiece surface material effects is:

$$KCOMP(MAT)_P = \frac{SDSS_P^{REF}}{SDSS(MAT)_P^{RAW}} \quad \text{(Eq. 12)}$$

Using the relationship of EQUATION 12, we may rewrite EQUATION 6 as:

$$MS_P^{COMP}(Z) = KCOMP(MAT)_P * [SDSS(MAT)_P^{RAW} * KPEN_P(Z)] \quad \text{(Eq. 13)}$$

Combining EQUATIONS 11 and 13:

$$MS_P^{COMP}(Z) = KCOMP(MAT)_P * MS(MAT)_P^{RAW}(Z) \quad \text{(Eq. 14)}$$

By analogy to the previous discussion of EQUATIONS 8 and 9, a set of workpiece material-specific distance-independent profile component compensation data $KCOMP(MAT)_P$ may be determined that convert the raw measurement signal values $MS(MAT)_P^{RAW}(Z)$ that arise from a specific workpiece material to compensated measurement signal values $MS_P^{COMP}(Z)$, in order to match distance calibration data (e.g., the distance calibration data 410, for example).

The '456 patent teaches a "bypass" method for characterizing and/or compensating the source+detector terms $SI_P^{RAW}$ and $DG_P^{RAW}$ described with reference to EQUATIONS 4 and 10, but does not address the material-specific term $MWF(MAT)_P$ included in EQUATION 10 or the associated material-specific effects reflected in EQUATIONS 11-14. Material reflectivity characteristics and related errors are ignored in the '456 patent, and the "bypass" methods of calibration and/or compensation that bypass the optical pen as taught in the '456 patent also bypass the workpiece surface. As such, the '456 patent offers no method of gathering material reflectivity data related to a workpiece surface, nor for recognizing or correcting related errors.

Assuming one knows what material is forming a workpiece surface identified for measurement, one way to determine a useful material-specific term $MWF(MAT)_P$ is through the use of known predetermined data characterizing the wavelength-dependent reflectivity variations of the material of the identified workpiece surface. As one example, as discussed previously, FIG. 7 illustrates known spectral reflectivity data as a function of wavelengths for different types of workpiece materials. It will be appreciated that one may know which pixels of a wavelength detector of a CPS system correspond to which wavelengths, by calibration or design. Therefore, one may use a "% reflectance" value shown at a particular wavelength for a material in FIG. 7 and store that value in relation to the corresponding pixel P (e.g., in the memory portion 168), and use such data as the material-specific term $MWF(MAT)_P$ for the pixel P, and so on for each pixel of the detector for that material. Such data define distance-independent profile component compensation data comprising data that are usable to compensate the output spectral profile data for potential measurement distance errors comprising distance-independent profile component errors associated with the workpiece material component corresponding to an identified workpiece surface. The workpiece specific compensation portion 167 may apply such data to compensate for errors associated with the workpiece material component. In order to eliminate material related distortions in raw intensity profile signals, it is desirable to compensate the raw intensity profile signals for their distance-independent component including the workpiece material component prior to determining the peak location and the DIC, in various embodiments, such that the compensated intensity profile signals correspond to the calibrations conditions used to determine the relationship between a DIC and its corresponding distance measurement. As previously noted, the '456 patent teaches a "bypass" method for characterizing and compensating the source+detector terms $SI_P^{RAW}$ and $DG_P^{RAW}$. Thus, all the terms on the right side of EQUATION 10 may be characterized and compensated in the CPS system electronics, e.g., by implementing the teachings outlined above with reference to EQUATIONS 10-14. It will be appreciated that the data shown in FIG. 7 may be characterized in various ways other than "% reflectance." For example, the values for a particular material may be normalized such that the maximum reflectivity has a value of 1, and the other values become normalized reflectivity coefficients as a function of wavelength or corresponding pixel. It will be appreciated that in some embodiments, the compensation data represented by the various terms $MWF(MAT)_P$, $SI_P^{RAW}$, and $DG_P^{RAW}$ may be stored and/or applied separately for compensation of the various constituents of the distance independent component. In other embodiments, the compensation data represented by the various terms $MWF(MAT)_P$, $SI_P^{RAW}$, and $DG_P^{RAW}$ may be functionally combined and stored and/or applied for compensation of all the constituents of the distance independent component at once (e.g., as previously outlined for the compensation terms $KCOMP(MAT)_P$).

Figure 8:
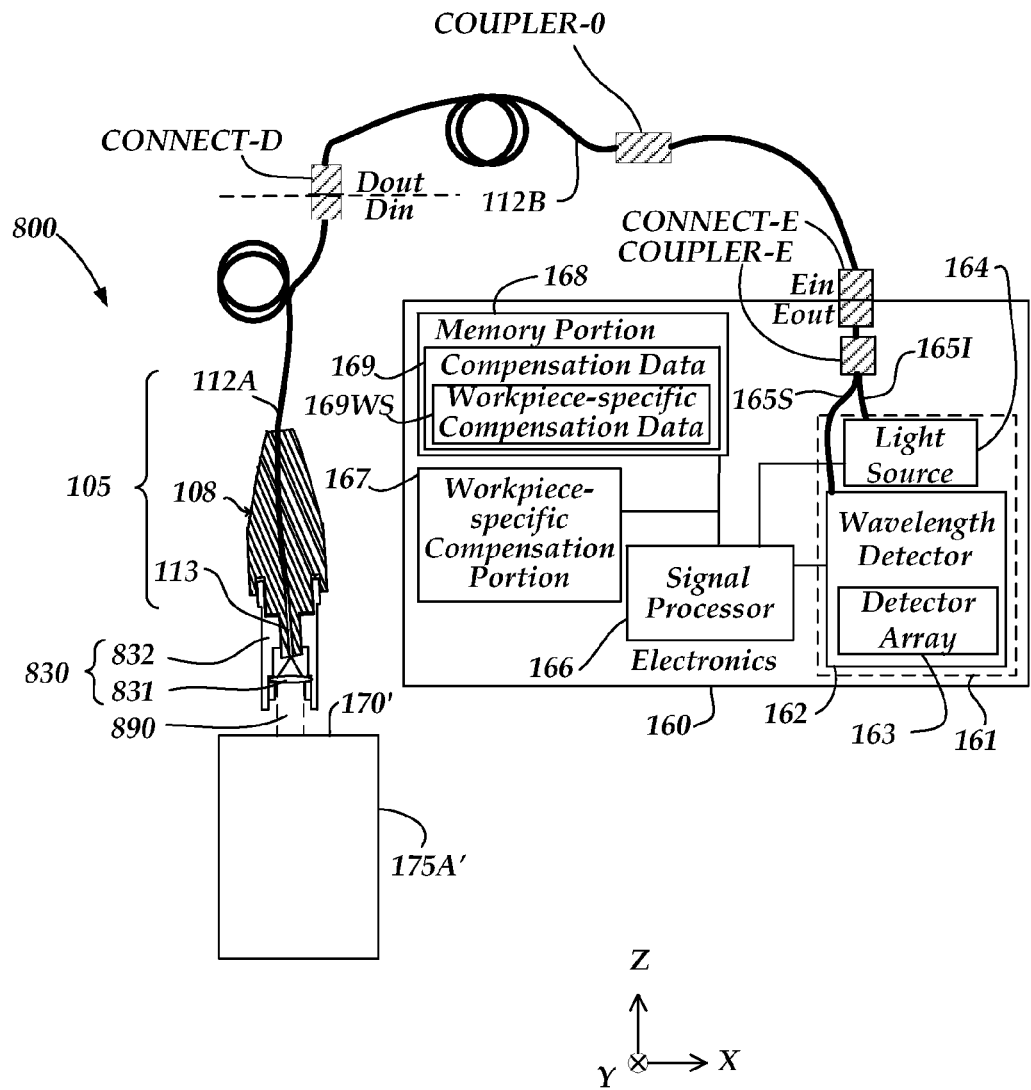
FIG. 8 is a block diagram illustrating an exemplary system that utilizes a distance-independent optical path and a CPS electronics for determining error compensation data that are usable to compensate output spectral profile data for errors including errors associated with the reflectivity of a workpiece material.

FIG. 8 illustrates a way to determine a set of distance-independent profile component compensation data KCOMP $(MAT)_P$, which are usable to compensate output spectral profile data for potential measurement distance errors comprising all of the distance-independent profile component errors, including errors associated with a workpiece material component. FIG. 8 is a block diagram 800 illustrating the CPS electronics 160 and various connecting components previously described with reference to FIG. 1, used in combination with a non-dispersing attachment 830, in order to provide a distance-independent optical path. That is, the system shown in the block diagram 800 does not include an optical pen, and does not create a distance dependent wavelength peak in its output spectral profile. Rather, by using the non-dispersing attachment 830 which is not configured to focus different wavelengths at different distances, its output spectral profile nominally includes only the distance-independent profile component. In the particular embodiment shown in FIG. 8, the non-dispersing attachment 830 comprises a housing assembly 832 which includes a mounted collimating (or approximately collimating) lens 831, which may be used to output an approximately collimated beam to a material surface 170', comprising a representative material for which compensation data is desired. In various implementations, the representative material may be either the material of an identified workpiece surface that is to be measured, or a material corresponding to the material of an identified workpiece surface that is to be measured at a later time, or the like.

In operation, the material receives light 890 from the CPS light source through an optical path comprising a portion of the normal operation optical path and the non-dispersing attachment 830 and reflects light 890 back through the optical path to the CPS wavelength detector, which provides output spectral profile data. That output spectral profile data is distance-independent output spectral profile data, which can be analyzed by the CPS electronics 160 (or alternatively, a host system) to determine distance-independent profile component compensation data. For the configuration shown in FIG. 8, the distance-independent profile components represented by the terms $SI_P^{RAW}$ and $DG_P^{RAW}$, as well as the workpiece material component represented by the term $MWF(MAT)_P$, are all present simultaneously in the distance independent output profile. Therefore, the resulting distance-independent profile component compensation data is usable to compensate for all of these terms in combination, including errors associated with the reflectivity of a workpiece material similar to the representative material. Regarding analysis to determine the compensation data, in terms of the previously described equations, since the profile or set of signals $SDSS_P^{REF}$ are known because they are the reference set (e.g., as used for distance calibration), and the profile or set of raw signals $SDSS(MAT)_P^{RAW}$ may be known because they may be measured as described herein, then a set of distance-independent profile component compensation data KCOMP $(MAT)_P$ may be determined that convert raw measurement signal values $MS(MAT)_P^{RAW}(Z)$ (which form output spectral profile data), that arise from a workpiece material that is similar to the representative material, to compensated measurement signal values $MS_P^{COMP}(Z)$, in order to match distance calibration data (e.g., the distance calibration data 410, for example).

Figure 9:
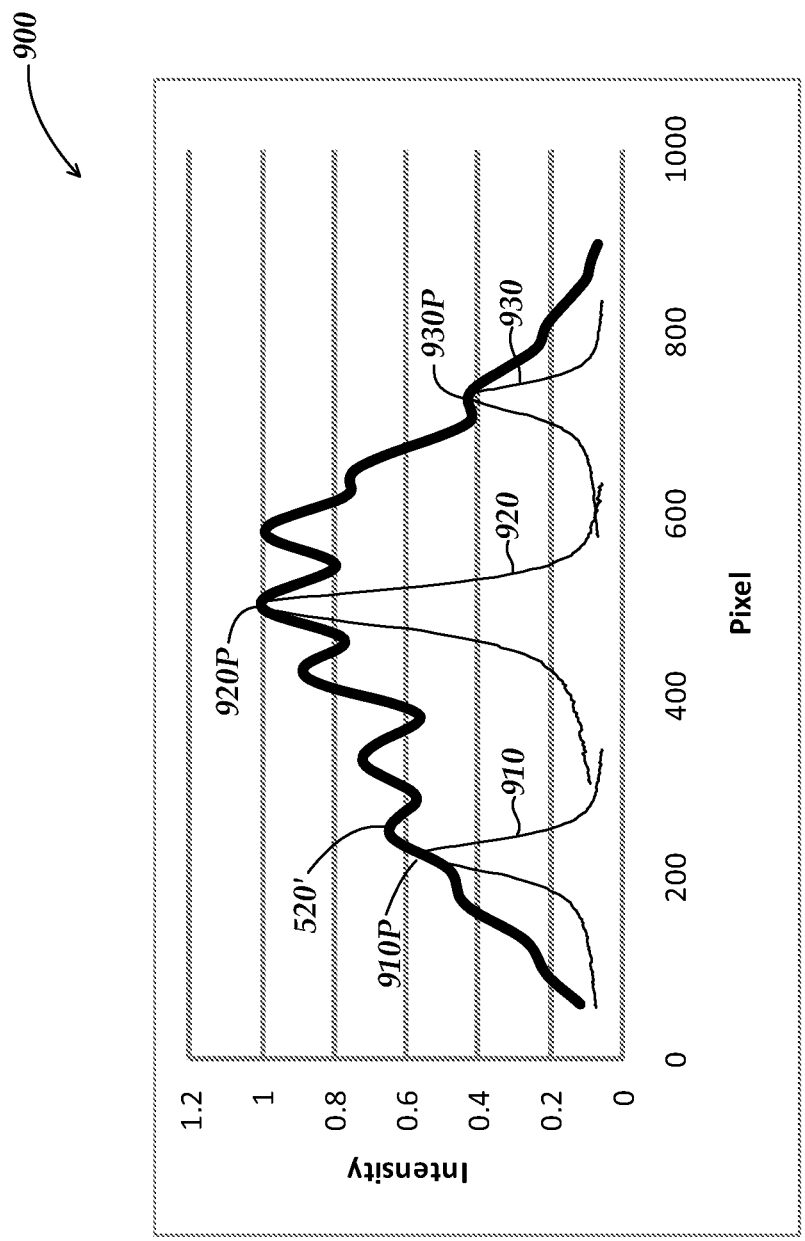
FIG. 9 is a diagram of a graph illustrating three exemplary instances of peak signals obtained at different wavelengths and/or detector pixels during a wavelength peak scanning operation using a CPS system.

FIG. 9 provides an illustration useful in explaining another way to determine a set of distance-independent profile component compensation data $KCOMP(MAT)_P$, which are usable to compensate output spectral profile data for potential measurement distance errors comprising all of the distance-independent profile component errors, including errors associated with a workpiece material component. FIG. 9 shows a diagram of a graph 900 illustrating example peak region signals 910, 920, and 930 obtained during a wavelength peak scanning operation. Briefly stated, the scanning operation scans the optical pen or the measured surface along the z-axis direction (to a plurality of measurement distances), relative to a representative material surface that is measured. During this process, each Z location produces a spectral peak at a corresponding wavelength and/or pixel location along the measuring axis of the wavelength detector. It will be appreciated that for the peak wavelength at a particular measurement distance, that precise wavelength is approximately ideally focused through the confocal arrangement of the optical, such that for that peak wavelength or pixel the optical signal is not spatially filtered by the optical pen. Thus, unlike wavelengths away from the peak wavelength or pixel, it does not have an attenuation due to the distance-dependent spatial filtering provided by the optical pen. In this sense, at the precise peak wavelength or pixel the effects of the optical pen in producing a "distance dependent profile component" are absent. Thus, by using the CPS system to perform a plurality of measurement operations corresponding to a plurality of respective distances distributed along a measuring range of the CPS optical pen relative to the positioned material, that plurality of measurement operations may provide a corresponding plurality of output spectral profile data including a plurality of wavelength peaks distributed along the measurement axis of the CPS wavelength detector, such as the exemplary wavelength peaks 910P, 920P, and 930P of the peak region signals 910, 920, and 930. Because each of the wavelength peaks are nominally not attenuated by the effects of a distance-dependent profile component, they may be considered to represent data points sampled along a "composite" distance-independent spectral profile 520'. In one embodiment, the signal value at a wavelength peak or peak pixel may be determined by locating the wavelength peak or peak pixel, as outlined above with reference to FIG. 3, and determining the signal value at that peak location. Alternatively, in some embodiments, a recursive procedure may be used to reduce the small remaining errors in the foregoing procedure. It will be appreciated that while only three wavelength peaks are shown in FIG. 9 for purposes of illustration, in practice, a greater number wavelength peaks may be obtained during a wavelength peak scanning operation in order to characterize a composite distance-independent profile component at a desired number of pixels. In various embodiments, the composite distance-independent profile component may be characterized at most or all detector pixels if desired. For example, in one implementation the wavelength peak scanning operation may comprise moving one of the optical pen and the representative material continuously to provide a large plurality of respective distances distributed along a measuring range of the CPS optical pen, and operating the CPS system continuously during the moving in order to perform a large plurality of measurement operations to provide wavelength peaks at most or all pixel locations.

In any case, the resulting composite distance dependent profile data can be analyzed by the CPS electronics 160 (or alternatively, a host system) to determine distance-independent profile component compensation data. For the configuration shown in FIG. 9, the distance-independent profile components represented by the terms $SI_P^{RAW}$ and $DG_P^{RAW}$, as well as the workpiece material component represented by the term $MWF(MAT)_P$, are all present simultaneously in the composite distance-independent output profile. Therefore, the resulting distance-independent profile component compensation data is usable to compensate for all of these terms in combination, including errors associated with the reflectivity of a workpiece material similar to the representative material. Regarding analysis to determine the compensation data, in terms of the previously described equations, since the profile or set of signals $SDSS_P^{REF}$ is known because it is the reference set (e.g., as used for distance calibration), and the composite distance-independent profile or set of raw signals $SDSS(MAT)_P^{RAW}$ (each of which is derived from a precise peak wavelength signal) may be known because it may be measured as described above, then a set of distance-independent profile component compensation data $KCOMP(MAT)_P$ may be determined that convert raw measurement signal values $MS(MAT)_P^{RAW}(Z)$ (which form output spectral profile data), that arise from a workpiece material that is similar to the representative material, to compensated measurement signal values $MS_P^{COMP}(Z)$ in order to match distance calibration data (e.g., the distance calibration data 410, for example).

The set of distance-independent profile component compensation data $KCOMP(MAT)_P$ characterizes the differences between distance-independent calibration profile component represented by the set of signals $SDSS(MAT)_P^{REF}$ and the distance-independent profile component represented by the composite distance-independent profile or set of raw signals $SDSS(MAT)_P^{RAW}$ as a set of ratios, at a plurality of pixel locations distributed along the measurement axis of the CPS wavelength detector. However, it should be appreciated that in other embodiments, a set of distance-independent profile component compensation data may characterize the differences between distance-independent calibration profile component represented by the set of signals $SDSS_P^{REF}$ and the distance-independent profile component represented by the composite distance-independent profile or set of raw signals $SDSS(MAT)_P^{RAW}$ as a set differences between normalized magnitudes of the profile components, or as a continuous function of pixel location, or the like. More generally, based on this disclosure, it will be appreciated that there are various ways to characterize the individual terms of EQUATION 10 and/or to characterize the reference profile or set of signals $SDSS_P^{REF}$, and the various distance-independent profile components or shape contributions may be determined and compensated individually in some embodiments, in combination in some embodiments, or sequentially in other embodiments. It will be appreciated that the foregoing equations and methods are illustrative and exemplary only and are not limiting.

Figure 10:
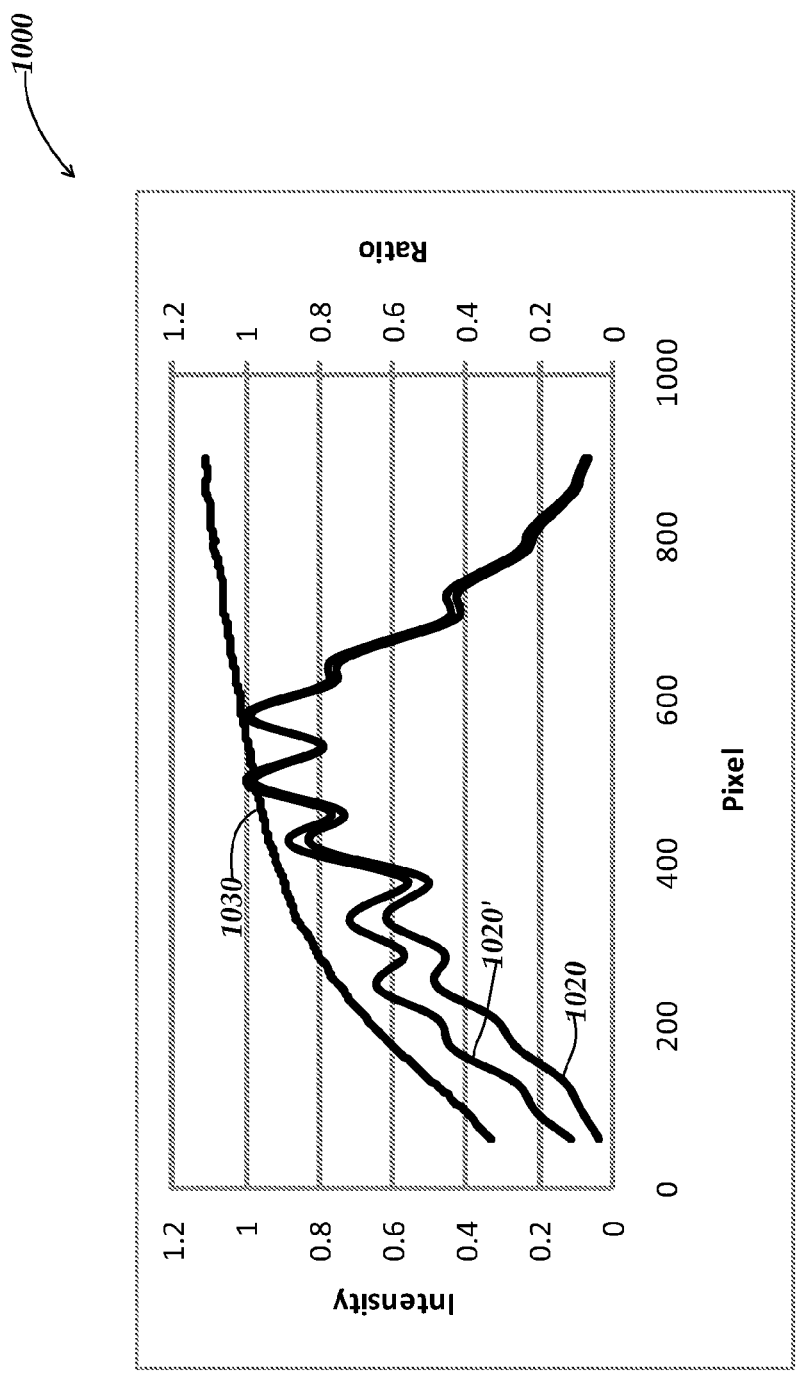
FIG. 10 is a diagram of a graph illustrating the results obtained from a wavelength peak scanning operation using a CPS system for two different workpiece surface materials.

FIG. 10 is a diagram of a graph 1000 illustrating data obtained using a wavelength peak scanning operation such as that outlined above. The data shows a distance-independent spectral profile 1020 revealing the distance-independent profile component associated with a gold mirror used for a first wavelength peak scanning operation and a distance-independent spectral profile 1020' revealing the distance-independent profile component associated with an aluminum surface used for a second wavelength peak scanning operation. FIG. 10 also shows ratio data 1030 which illustrates the ratio between the profiles 1020 and 1020' at each pixel. For purposes of illustration, in one embodiment the gold minor may be used for determining distance calibration data such as that described with reference to FIG. 4, and the gold minor distance-independent spectral profile 1020 may then be considered to define a set of calibration signals $SDSS_P^{REF}$ that characterize the source+detector subsystem in combination with the gold minor material. The aluminum surface distance-independent spectral profile 1020' may be considered to define a set of signals $SDSS(ALUM)_P^{RAW}$ that characterize the same source+detector subsystem in combination with the aluminum surface material. The ratio data 1030 may be defined to be a set of workpiece-specific or material-specific distance-independent profile component compensation data $KCOMP(ALUM)_P$ as described with reference to EQUATION 12. Experiments have shown that if the gold mirror is used to establish distance calibration data, and if the output spectral profile data from the aluminum surface is not compensated using the compensation data $KCOMP(MAT)_P$, then measurement errors as large as approximately 1 micron result due to material reflectivity effects at some measurement distances for a CPS system having a 300 micron measuring range. In contrast, when output spectral profile data from the aluminum surface is compensated using the compensation data $KCOMP(MAT)_P$ prior to converting the distance-indicating coordinate to its calibrated measurement distance, then measurement errors are reduced to a level on the order of nanometers (e.g., 10 nanometers) throughout the 300 micron measuring range.

Figure 11:
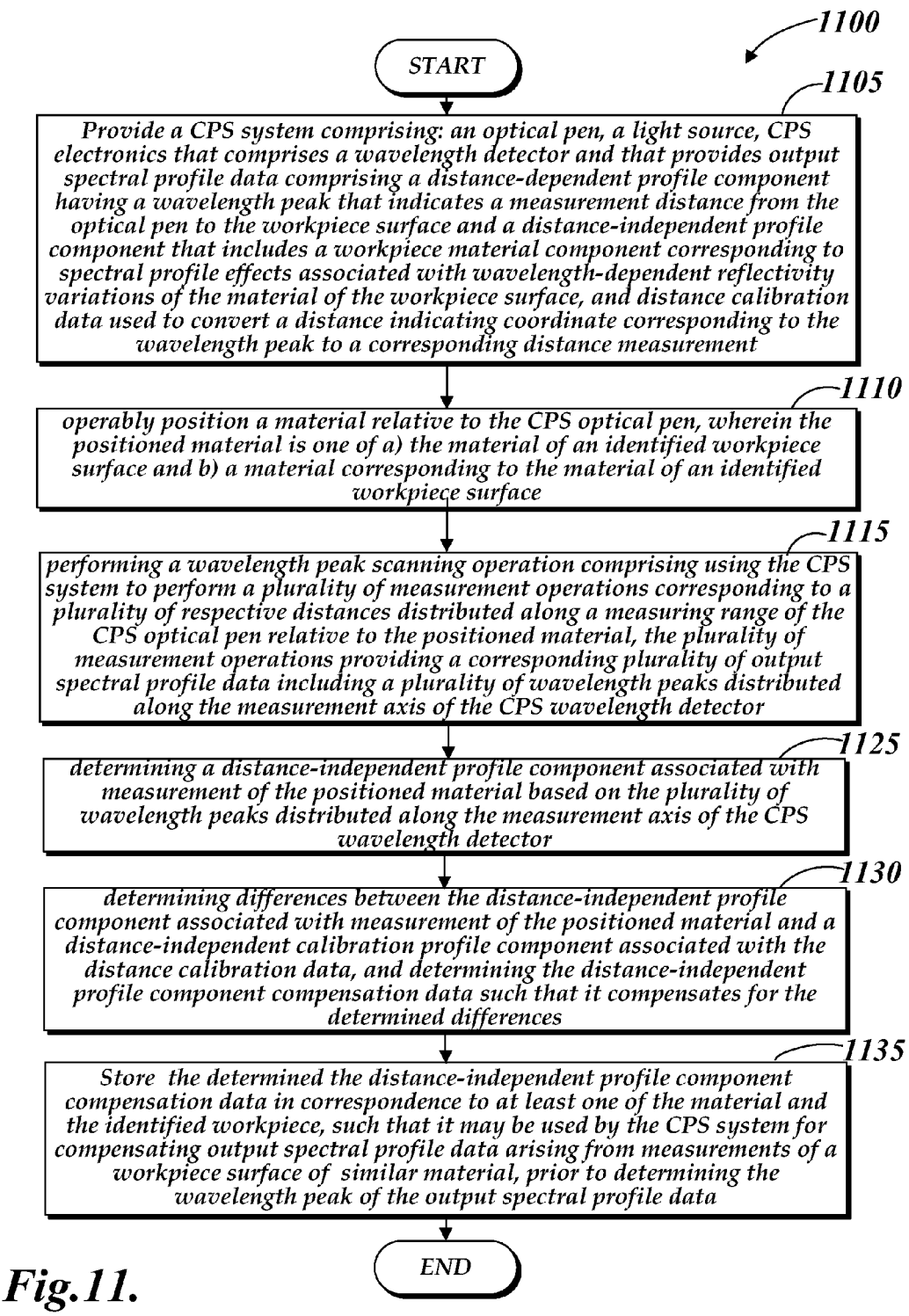
FIG. 11 is a flow diagram illustrating an exemplary routine that utilizes a wavelength peak scanning operation for determining distance-independent profile component compensation data that are usable to compensate output spectral profile data for errors including errors associated with the reflectivity of a workpiece material.

FIG. 11 is a flow diagram illustrating an exemplary routine 1100 that utilizes a wavelength peak scanning operation for determining distance-independent profile component compensation data that are usable to compensate output spectral profile data for errors including errors associated with the reflectivity of a workpiece material. In some embodiments, methods for error compensation factor determination according to this invention may be implemented by operations of the CPS electronics (e.g., by execution of routines residing in memory portion 168, as implemented under control of the signal processor 166). The CPS electronics may include a means for activating an error compensation factor determination mode if desired, which may operate to determine compensation data according to teachings as outlined with reference to EQUATIONS 10-14, for example, in contrast to the normal measuring operation mode of the CPS. In other embodiments, methods for error compensation factor determination according to this invention may be implemented by operations of a host system (e.g., a general purpose personal computer) connected to and interacting with the CPS electronics.

As shown in FIG. 11, at a block 1105, a CPS system is provided comprising: an optical pen, a light source, CPS electronics that comprises a wavelength detector and that provides output spectral profile data comprising a distance-dependent profile component having a wavelength peak that indicates a measurement distance from the optical pen to the workpiece surface and a distance-independent profile component that includes a workpiece material component corresponding to spectral profile effects associated with wavelength-dependent reflectivity variations of the material of the workpiece surface, and distance calibration data used to convert a distance-indicating coordinate corresponding to the wavelength peak to a corresponding distance measurement.

At a block 1110, a material is operably positioned relative to the CPS optical pen, wherein the positioned material is one of (a) the material of an identified workpiece surface and (b) a material corresponding to the material of an identified workpiece surface.

At a block 1115, a wavelength peak scanning operation is performed comprising using the CPS system to perform a plurality of measurement operations corresponding to a plurality of respective distances distributed along a measuring range of the CPS optical pen relative to the positioned material, the plurality of measurement operations providing a corresponding plurality of output spectral profile data including a plurality of wavelength peaks distributed along the measurement axis of the CPS wavelength detector. At a block 1125, a distance-independent profile component associated with measurement of the positioned material is determined based on the plurality of wavelength peaks distributed along the measurement axis of the CPS wavelength detector. In various embodiments, the operations of blocks 1115 and 1125 may be performed based on the teachings previously outlined with reference to FIG. 9, for example.

At a block 1130, differences between the distance-independent profile component associated with measurement of the positioned material and a distance-independent calibration profile component associated with the distance calibration data are determined, and distance-independent profile component compensation data are determined such that they compensate for the determined differences when applied to output spectral profile data resulting from measurement of a surface comprising material similar to the positioned material. In various embodiments, the operations of block 1130 may be performed based on the teachings previously outlined with reference to FIG. 10, for example.

At a block 1135, the determined distance-independent profile component compensation data are stored in correspondence to at least one of the material and the identified workpiece, such that the compensation data may be used by the CPS system for compensating output spectral profile data arising from measurements of a workpiece surface of a similar material, prior to determining the wavelength peak of the output spectral profile data. The resulting wavelength peak will then be based on measurement data that is compensated such that the distance-indicating coordinate of the wavelength peak is properly usable in combination with the distance calibration data that converts the distance-indicating coordinate to a measurement distance. In other words, the wavelength peak and the distance-indicating coordinate will be based on compensated data such that the measurement distance will be nominally free from errors that would otherwise arise due to workpiece material variations. In one embodiment, the error-compensation data may be stored in the form of a lookup table. However, in other embodiments, the error-compensation data may be provided in any convenient and functionally analogous form (e.g., in the form of a polynomial function or the like).

Figure 12:
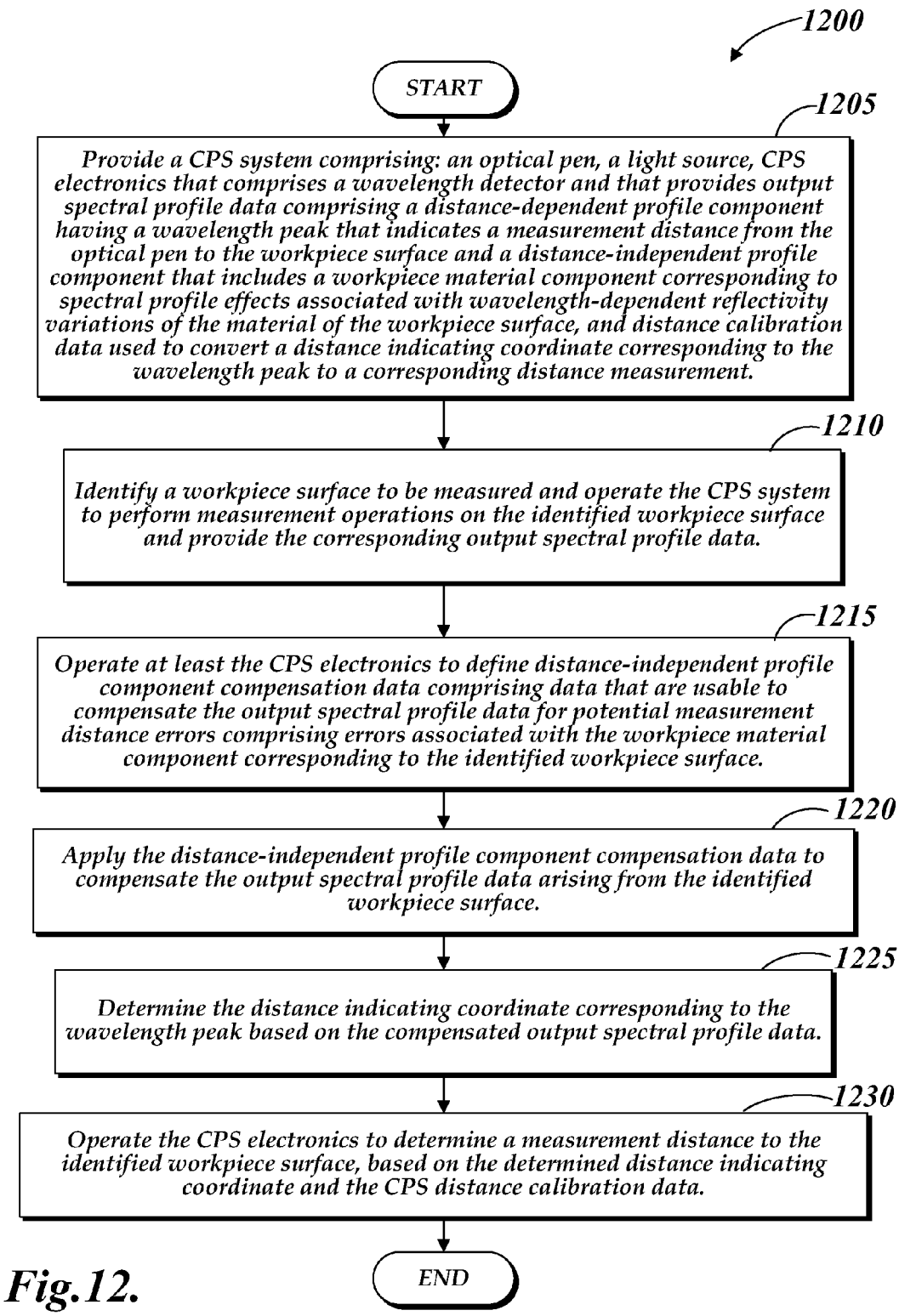
FIG. 12 is a flow diagram illustrating an exemplary routine for operating a chromatic point sensor using distance-independent profile component compensation data to compensate output spectral profile data for errors including errors associated with the reflectivity of a workpiece material.

FIG. 12 is a flow diagram illustrating an exemplary routine 1100 for operating a chromatic point sensor using distance-independent profile component compensation data to compensate output spectral profile data for errors including errors associated with the reflectivity of a workpiece material. As shown in FIG. 12, at a block 1205, a CPS system is provided comprising an optical pen, a light source, CPS electronics that comprises a wavelength detector and that provides output spectral profile data comprising a distance-dependent profile component having a wavelength peak that indicates a measurement distance from the optical pen to the workpiece surface and a distance-independent profile component that includes a workpiece material component corresponding to spectral profile effects associated with wavelength-dependent reflectivity variations of the material of the workpiece surface, and distance calibration data used to convert a distance-indicating coordinate corresponding to the wavelength peak to a corresponding distance measurement.

At a block 1210, a workpiece surface is identified to be measured and the CPS system is operated to perform measurement operations on the identified workpiece surface and provide the corresponding output spectral profile data. The operations of block 1210 may be performed according to known methods of operating a CPS, and/or as disclosed previously herein.

At a block 1215, at least the CPS electronics is operated to define distance-independent profile component compensation data comprising data that are usable to compensate the output spectral profile data for potential measurement distance errors comprising errors associated with the workpiece material component corresponding to the identified workpiece surface. In various embodiments and/or applications, the operations of block 1215 may be performed similarly to one of the methods disclosed previously herein. For example, in one embodiment, defining the distance-independent profile component compensation data comprises inputting predetermined data characterizing the wavelength-dependent reflectivity variations of the material of the identified workpiece surface, and determining the distance-independent profile component compensation data based on that input predetermined data. In some embodiments, the predetermined data may comprise standard (e.g., generally known and/or published) spectral reflectivity data characterizing to the type of material used in the identified workpiece surface. In another one embodiment, defining the distance-independent profile component compensation data comprises performing portions of the wavelength peak scanning operation described above with reference to FIG. 11, or analogous operations disclosed herein. In another one embodiment, defining the distance-independent profile component compensation data comprises performing operations described above with reference to FIG. 8, wherein a CPS electronics is combined with an optical path that is not configured to focus different wavelengths at different distances, and a representative material, and used to provide distance-independent output spectral profile data, and the distance-independent profile component compensation data is determined based on that distance-independent output spectral profile data.

At a block 1220, the distance-independent profile component compensation data is applied to compensate the output spectral profile data arising from the identified workpiece surface, for example, according to teachings previously outlined with reference to EQUATIONS 10-14, which may be implemented in the CPS electronics, or a host system, if desired.

At a block 1225, the distance-indicating coordinate corresponding to the wavelength peak is determined based on the compensated output spectral profile data of block 1220, and at a block 1230, the CPS electronics is operated to determine a measurement distance to the identified workpiece surface, based on the determined distance-indicating coordinate and the CPS distance calibration data. The operations of blocks 1225 and 1230 may be performed according to known methods of operating a CPS, and/or as disclosed previously herein.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for operating a chromatic point sensor (CPS) system to compensate for potential errors, including errors due to workpiece material effects, the method comprising:
   providing a CPS system comprising:
      an optical pen comprising a confocal optical path including a chromatically dispersive element and configured to focus different wavelengths at different distances proximate to a workpiece surface to be measured;
      a light source connected to provide an input spectral profile of wavelengths to the optical pen;
      a CPS electronics comprising a CPS wavelength detector comprising a plurality of pixels distributed along a measurement axis of the CPS wavelength detector, the plurality of pixels receiving respective wavelengths and providing output spectral profile data, wherein the CPS is configured such that when the optical pen is connected to the CPS electronics and operably positioned relative to the workpiece surface to perform measurement operations the optical pen inputs the input spectral profile and outputs corresponding radiation to the workpiece surface and receives reflected radiation from the workpiece surface and outputs reflected radiation to provide an output spectral profile to the CPS wavelength detector, the output spectral profile comprising a distance-dependent profile component having a wavelength peak that indicates a measurement distance from the optical pen to the workpiece surface and a distance-independent profile component that includes a workpiece material component corresponding to spectral profile effects associated with wavelength-dependent reflectivity variations of the material of the workpiece surface, and the CPS electronics provides corresponding output spectral profile data; and
      distance calibration data used to convert a distance-indicating coordinate corresponding to the wavelength peak to a corresponding distance measurement; and
   identifying a workpiece surface to be measured,
   wherein the method further comprises:
      operating at least the CPS electronics to define distance-independent profile component compensation data comprising data that are usable to compensate the output spectral profile data for potential measurement distance errors comprising errors associated with the workpiece material component corresponding to the identified workpiece surface.

2. The method of claim 1, further comprising:
   operating the CPS system to perform measurement operations on the identified workpiece surface and provide the corresponding output spectral profile data;
   applying the distance-independent profile component compensation data to compensate the output spectral profile data arising from the identified workpiece surface; and
   determining the distance-indicating coordinate corresponding to the wavelength peak based on the compensated output spectral profile data.

3. The method of claim 2, wherein applying the distance-independent profile component compensation data to compensate the output spectral profile data comprises adjusting the output spectral profile data to compensate for differences between a distance-independent profile component associated with measurement of the identified workpiece surface and a distance-independent calibration profile component associated with the distance calibration data.

4. The method of claim 3, wherein the distance-independent calibration profile component includes an adjustment such that it corresponds to a predetermined calibration spectral profile.

5. The method of claim 4, wherein the predetermined calibration spectral profile is a flat profile.

6. The method of claim 4, wherein the distance-independent calibration profile component adjustment compensates for wavelength-dependent variations of a light source and a wavelength detector and wavelength-dependent reflectivity variations of a calibration workpiece used for distance measurements used to determine the distance calibration data, such that it conforms to the predetermined spectral profile.

7. The method of claim 1, wherein the step of operating at least the CPS electronics to define the distance-independent profile component compensation data comprises defining data that are usable to compensate the output spectral profile data for potential measurement distance errors comprising errors associated with wavelength-dependent variations of at least one of the light source and the wavelength detector.

8. The method of claim 7, wherein the data that are usable to compensate errors associated with the workpiece material component comprise a first set of data, and the data that are usable to compensate errors associated with wavelength-dependent variations of at least one of the light source and the wavelength detector comprise a second set of data that is different than the first set of data.

9. The method of claim 7, wherein the distance-independent profile component compensation data comprises a set of data that are usable to compensate both errors associated with the workpiece material component and errors associated with the wavelength-dependent variations of at least one of the light source and the wavelength detector.

10. The method of claim 1, wherein operating at least the CPS electronics to define the distance-independent profile component compensation data comprises inputting predetermined data characterizing the wavelength-dependent reflectivity variations of the material of the identified workpiece surface, and determining the distance-independent profile component compensation data based on that input predetermined data.

11. The method of claim 1, wherein operating at least the CPS electronics to define the distance-independent profile component compensation data comprises:
   operably positioning a material relative to the CPS optical pen, wherein the positioned material is one of (a) the material of the identified workpiece surface and (b) a material corresponding to the material of the identified workpiece surface;
   performing a wavelength peak scanning operation comprising using the CPS system to perform a plurality of measurement operations corresponding to a plurality of respective distances distributed along a measuring range of the CPS optical pen relative to the positioned material, the plurality of measurement operations providing a corresponding plurality of output spectral profile data including a plurality of wavelength peaks distributed along the measurement axis of the CPS wavelength detector; and determining the distance-independent profile component compensation data based on the plurality of output spectral profile data provided by the wavelength peak scanning operation.

12. The method of claim 11, wherein determining the distance-independent profile component compensation data based on the plurality of output spectral profile data provided by the wavelength peak scanning operation comprises:
  determining a distance-independent profile component associated with measurement of the positioned material based on the plurality of wavelength peaks distributed along the measurement axis of the CPS wavelength detector;
  determining differences between the distance-independent profile component associated with measurement of the positioned material and a distance-independent calibration profile component associated with the distance calibration data; and
  determining the distance-independent profile component compensation data such that it compensates for the determined differences.

13. The method of claim 12, wherein the distance-independent profile component compensation data is determined in a form comprising one of (a) differences between a normalized magnitude of the profile components at a plurality of pixel locations distributed along the measurement axis of the CPS wavelength detector, and (b) a ratio of the profile components at a plurality of pixel locations distributed along the measurement axis of the CPS wavelength detector.

14. The method of claim 11, further comprising:
  storing the determined distance-independent profile component compensation data in memory portion of the CPS system;
  operating the CPS system to perform measurement operations on the identified workpiece surface and provide the corresponding output spectral profile data;
  recalling and applying the determined distance-independent profile component compensation data to compensate the output spectral profile data arising from the identified workpiece surface; and
  determining the distance-indicating coordinate corresponding to the wavelength peak based on the compensated output spectral profile data.

15. The method of claim 14, wherein:
  at least the optical pen of the CPS system is mounted in a host system which is one of a machine vision inspection system and coordinate measuring machine, such that it may be positioned relative to an identified workpiece surface to be inspected using the host system;
  the positioned surface is the identified workpiece surface; and
  performing the wavelength peak scanning operation comprises operating the host system to move to the plurality of respective distances distributed along a measuring range of the CPS optical pen relative to the positioned material.

16. The method of claim 15, wherein:
  the steps of performing the wavelength peak scanning operation and storing the determined distance-independent profile component compensation data are performed during a learn mode of operation of the host system; and
  the steps of operating the CPS system to perform measurement operations on the identified workpiece surface and provide the corresponding output spectral profile data, and recalling and applying the determined distance-independent profile component compensation data to compensate the output spectral profile data arising from the identified workpiece surface, and determining the distance-indicating coordinate corresponding to the wavelength peak based on the compensated output spectral profile data, are performed during a run mode of operation of the host system.

17. The method of claim 11, wherein performing the wavelength peak scanning operation comprises moving one of the optical pen and the positioned material continuously to provide at least some of the plurality of respective distances distributed along a measuring range of the CPS optical pen relative to the positioned material; and
  operating the CPS system continuously during the moving in order to perform at least some of the plurality of measurement operations corresponding to a plurality of respective distances.

18. The method of claim 1, wherein operating at least the CPS electronics to define workpiece-specific measurement spectral profile compensation data comprises:
  providing an optical path comprising a portion of the normal operation optical path of the CPS system and excluding the CPS optical pen, wherein the optical path is not configured to focus different wavelengths at different distances;
  positioning a material to receive light from the CPS light source through the optical path comprising a portion of the normal operation optical path and reflect light from the positioned material through the optical path to the CPS wavelength detector, wherein the positioned material is one of (a) the material of the identified workpiece surface and (b) a material corresponding to the material of the identified workpiece surface;
  performing a distance-independent measurement operation that provides distance-independent output spectral profile data based on the light reflected from the positioned material through the optical path to the CPS wavelength detector; and
  determining the distance-independent profile component compensation data based on that distance-independent output spectral profile data.

19. The method of claim 18, wherein determining the distance-independent profile component compensation data based on that distance-independent output spectral profile data comprises:
  determining a distance-independent profile component associated with the distance-independent measurement of the positioned material based on that distance-independent output spectral profile data;
  determining differences between the distance-independent profile component associated with measurement of the positioned material and a distance-independent calibration profile component associated with the distance calibration data; and
  determining the distance-independent profile component compensation data such that it compensates for the determined differences.

* * * * *